Apr. 24, 1923.
A. J. BRIGGS
1,453,125
MAIL DISTRIBUTING APPARATUS
Original Filed May 23, 1913     17 Sheets-Sheet 1
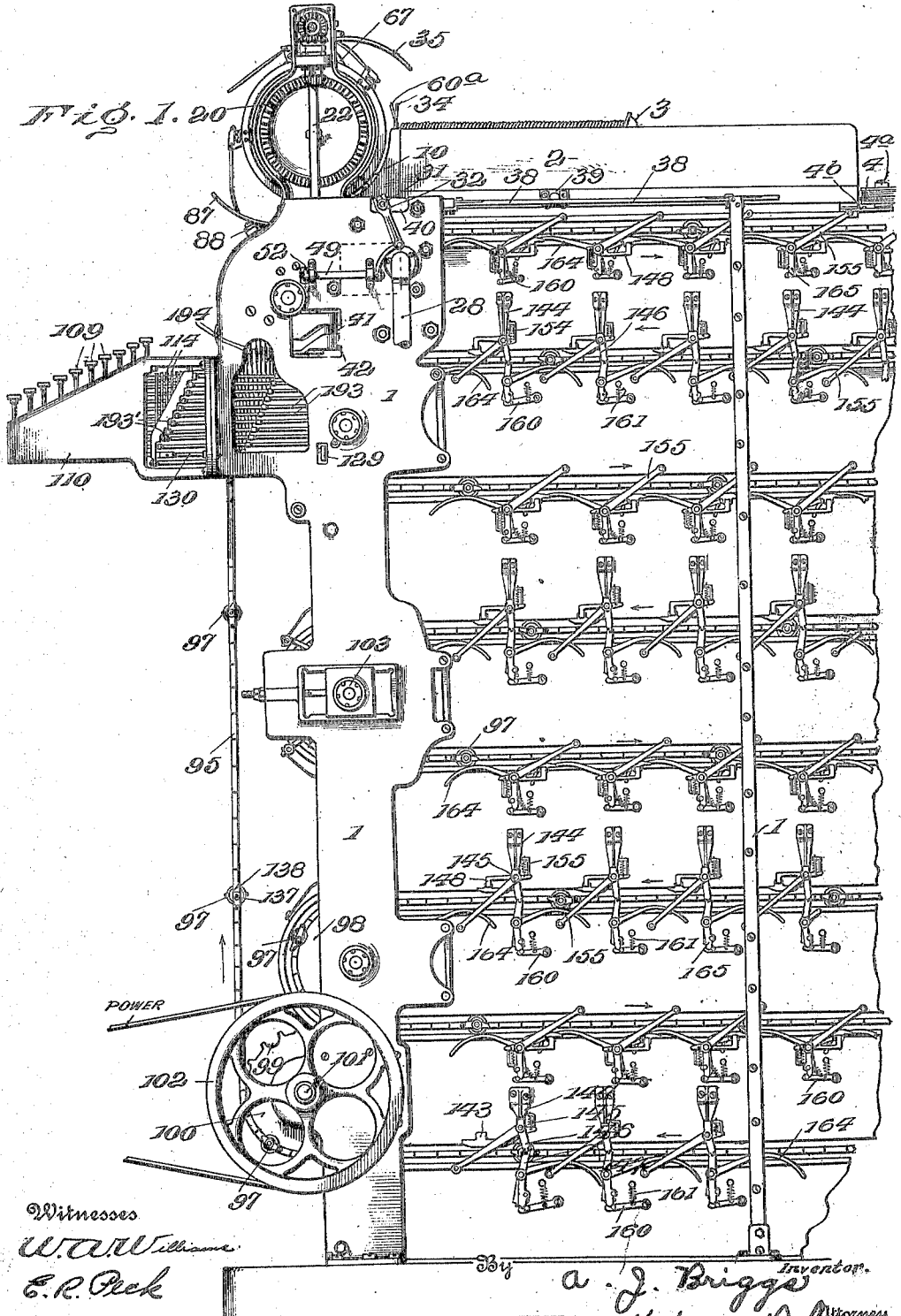

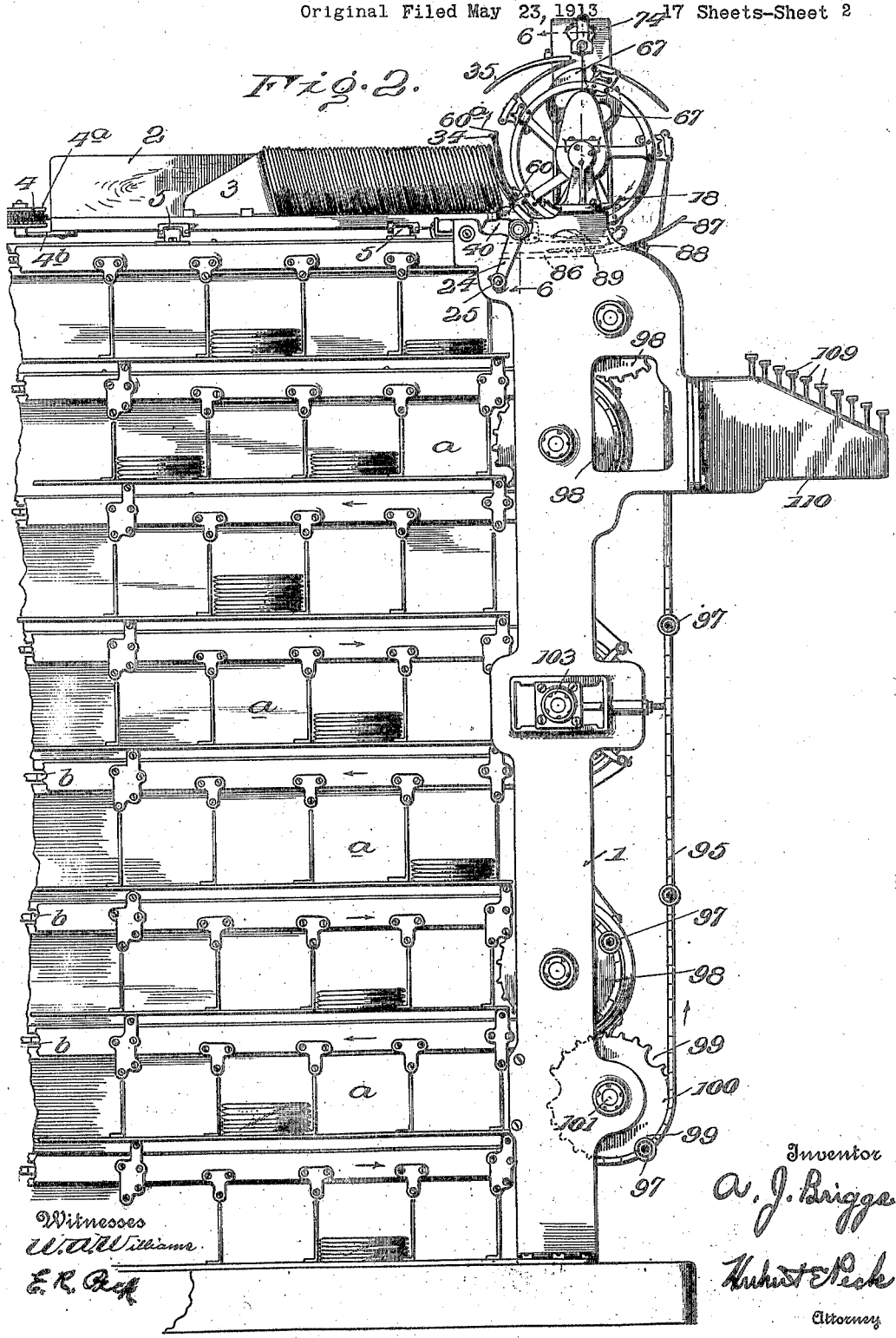

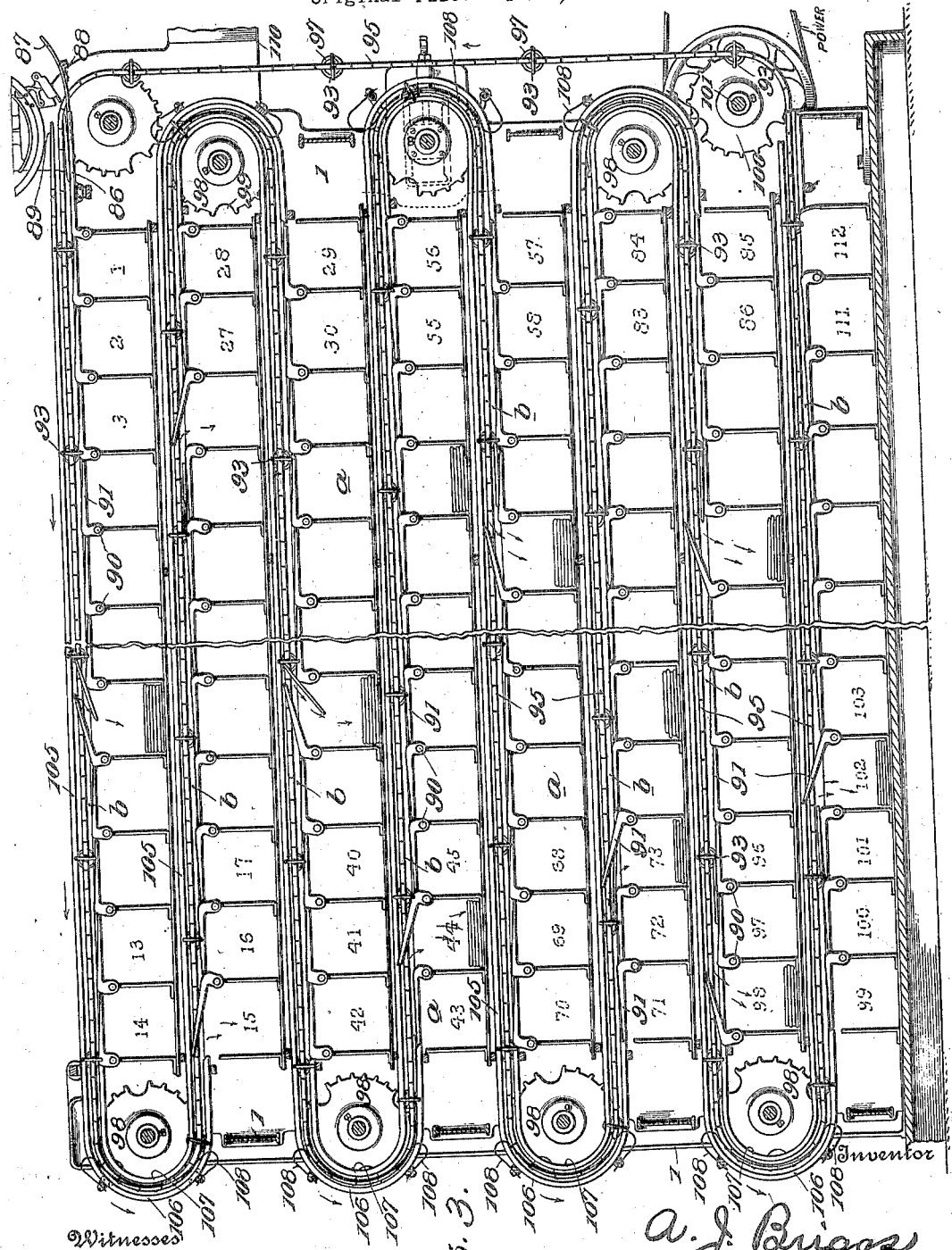

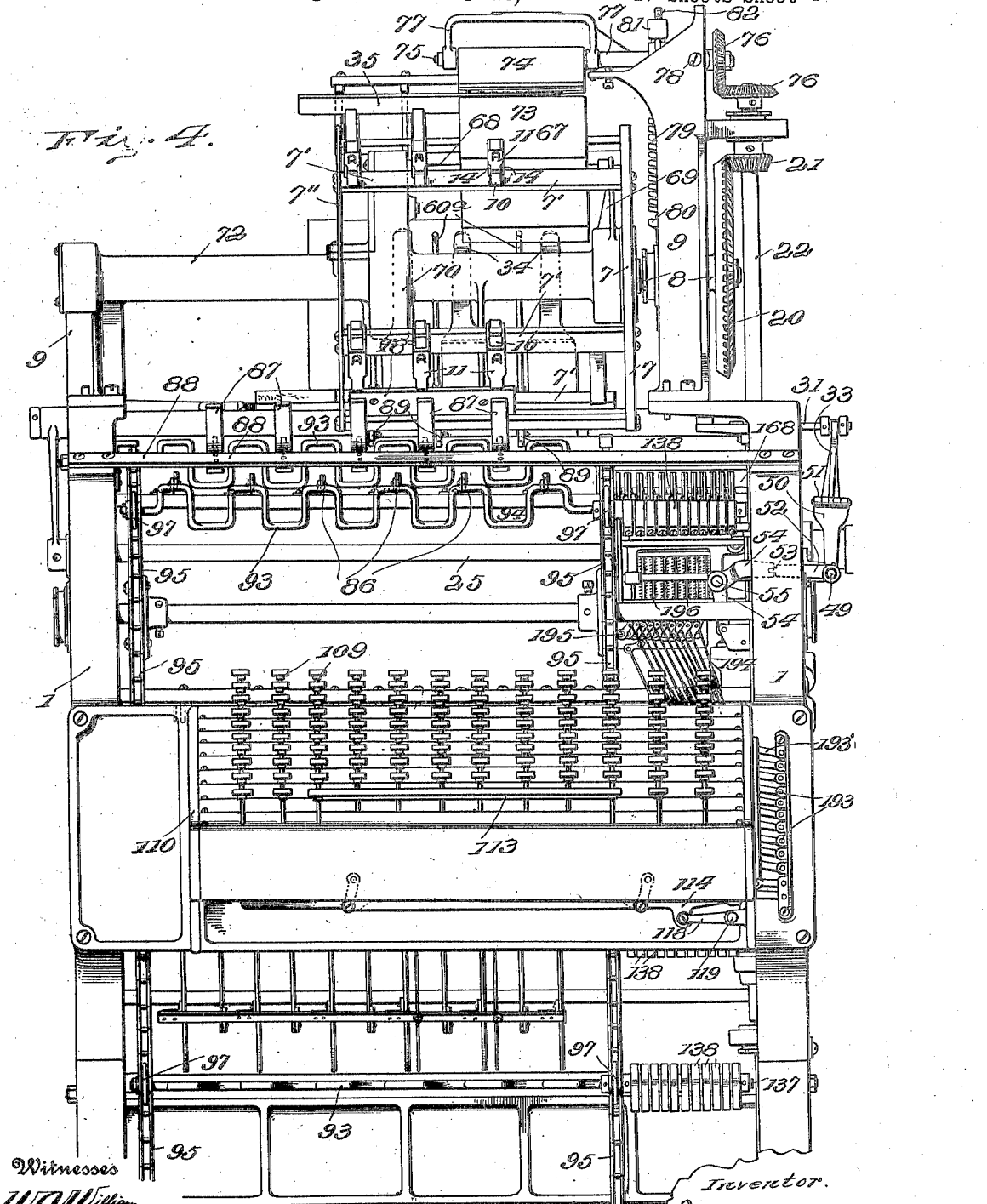

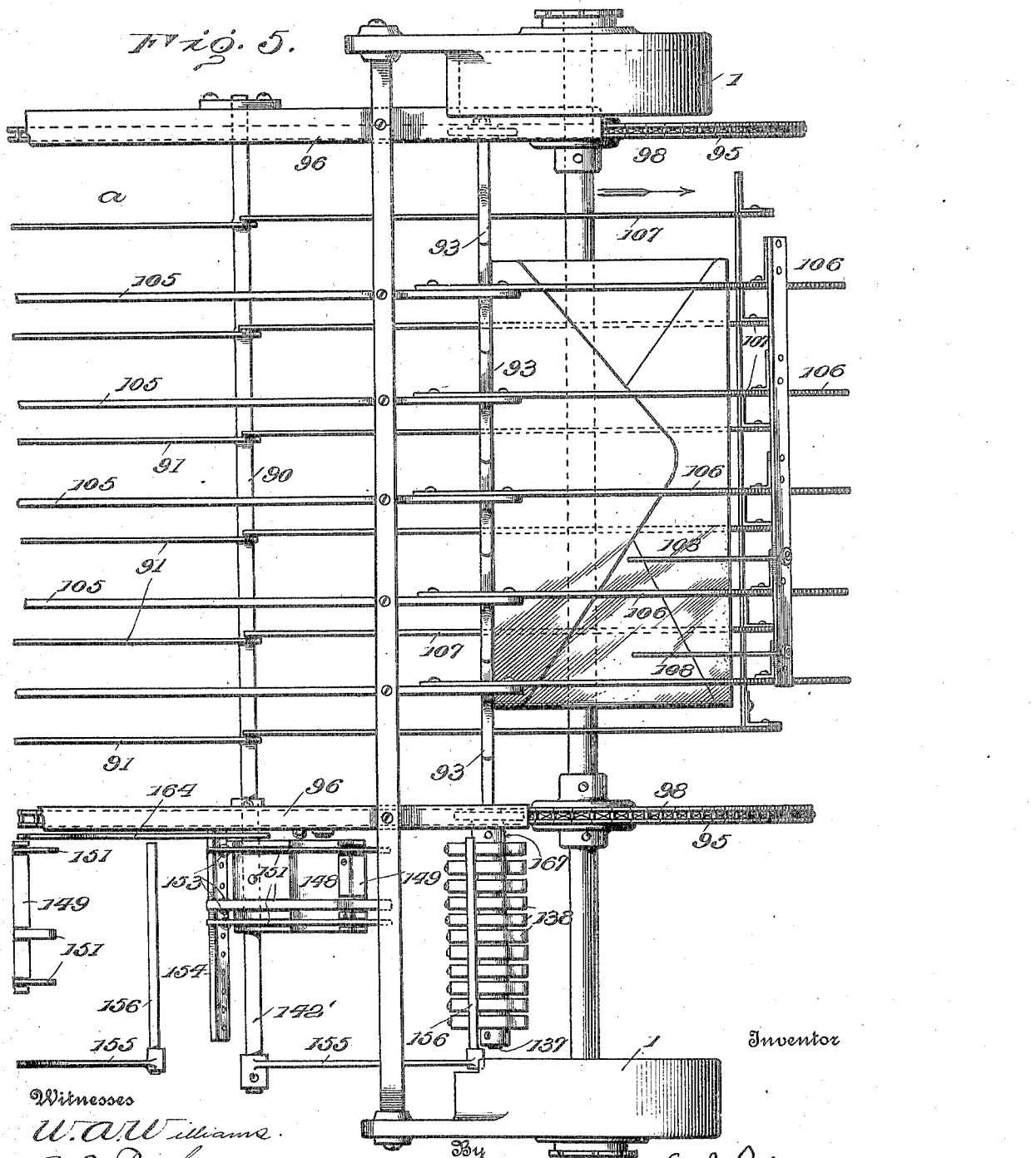

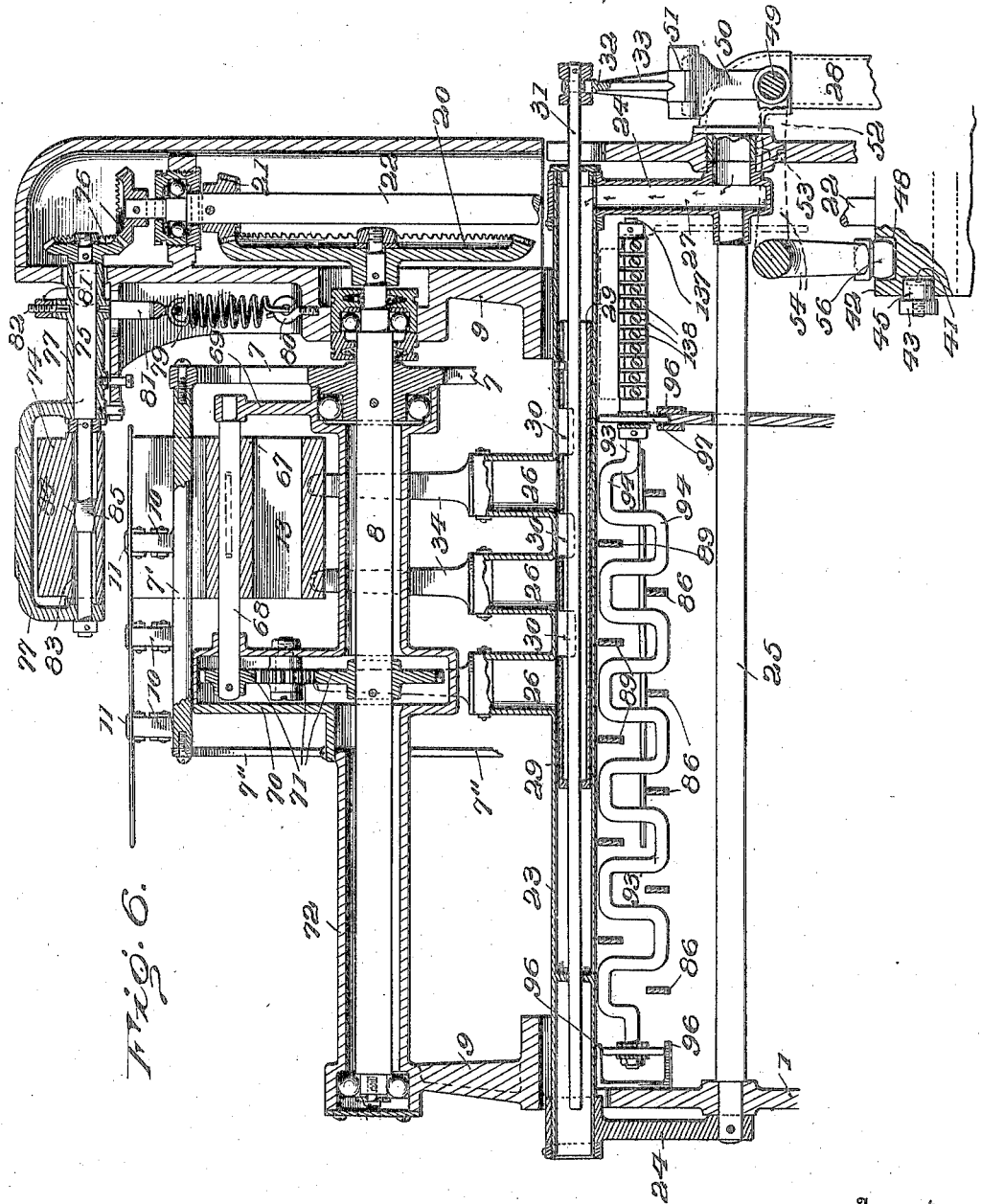

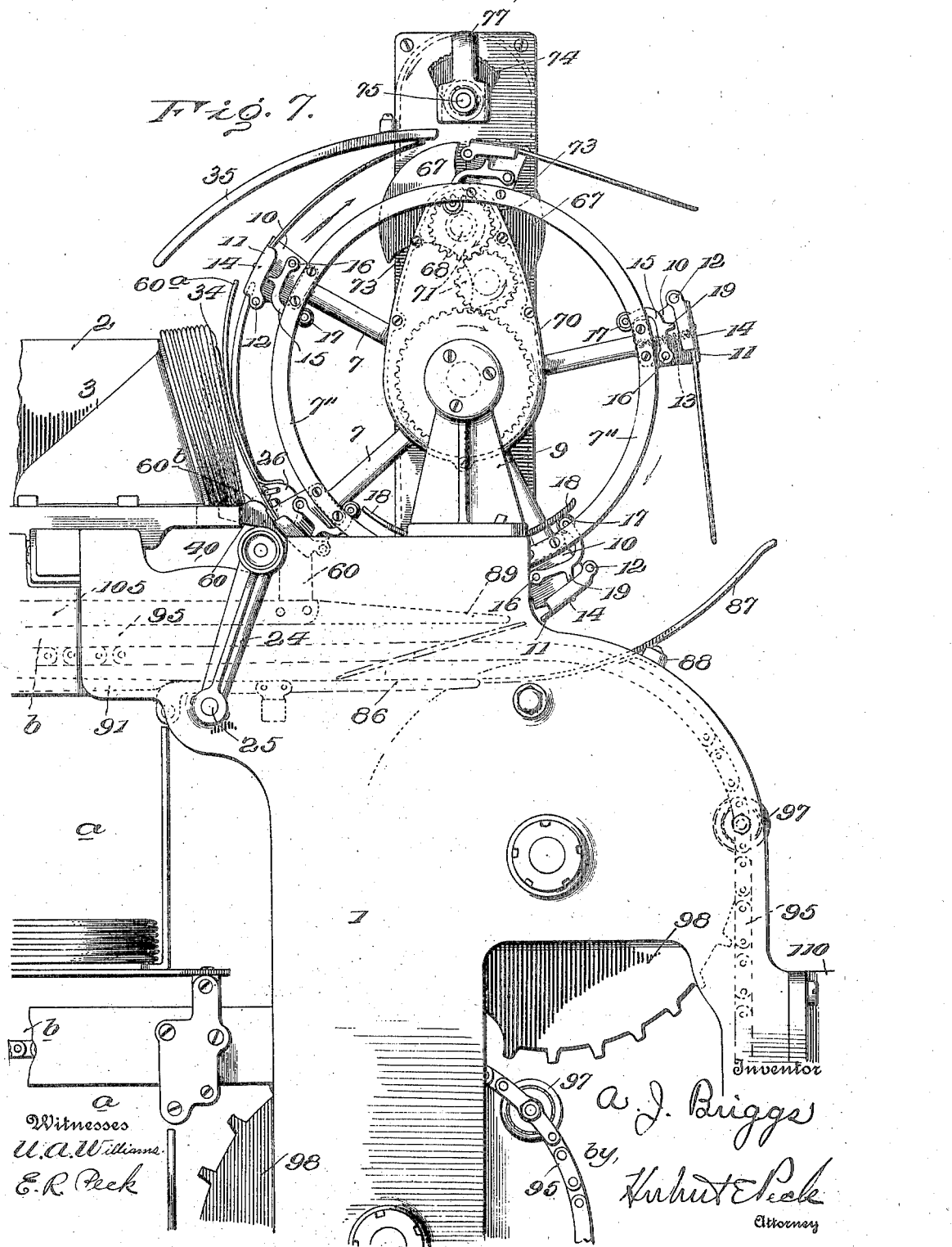

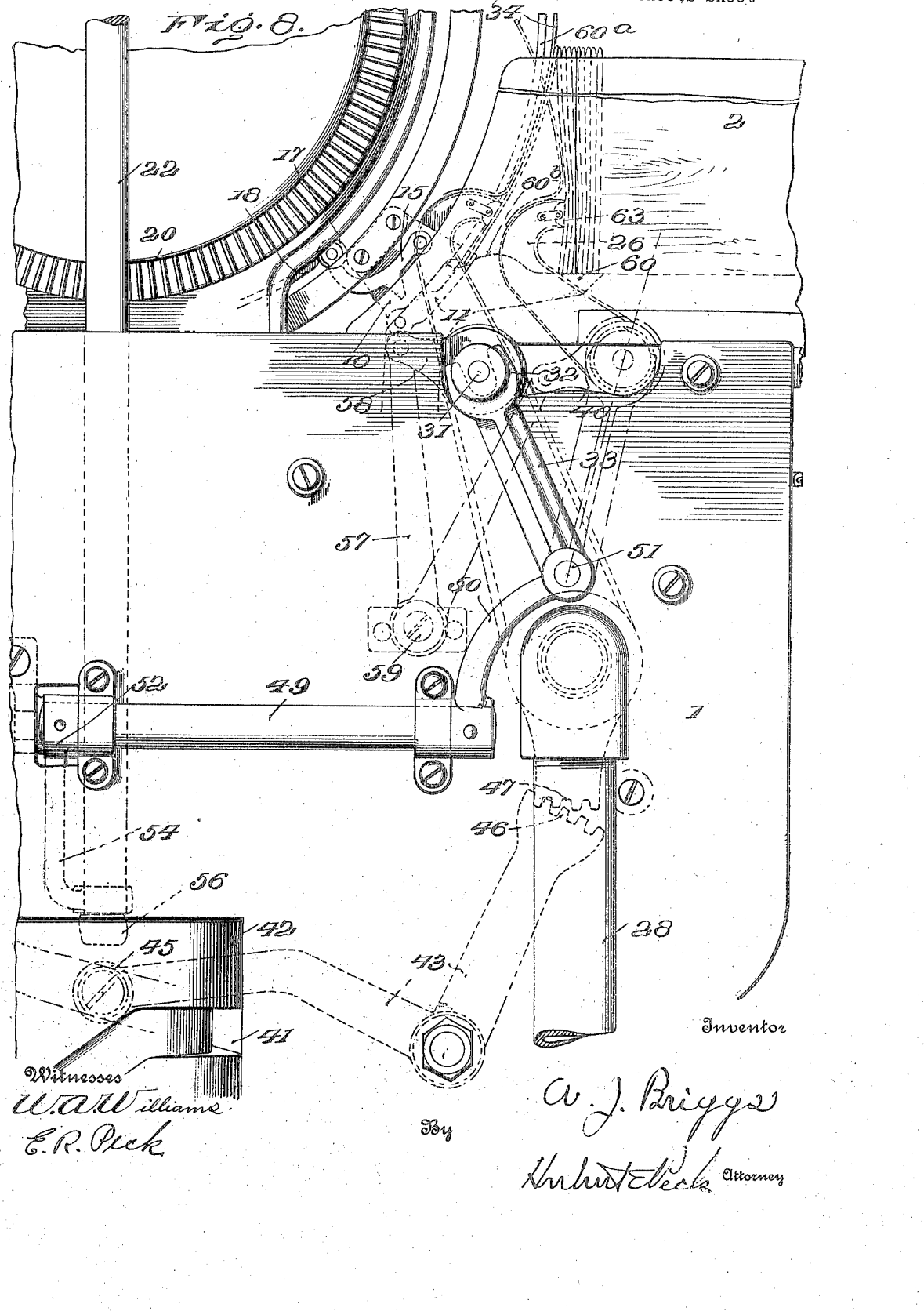

Apr. 24, 1923.
A. J. BRIGGS
1,453,125
MAIL DISTRIBUTING APPARATUS
Original Filed May 23, 1913     17 Sheets-Sheet 9
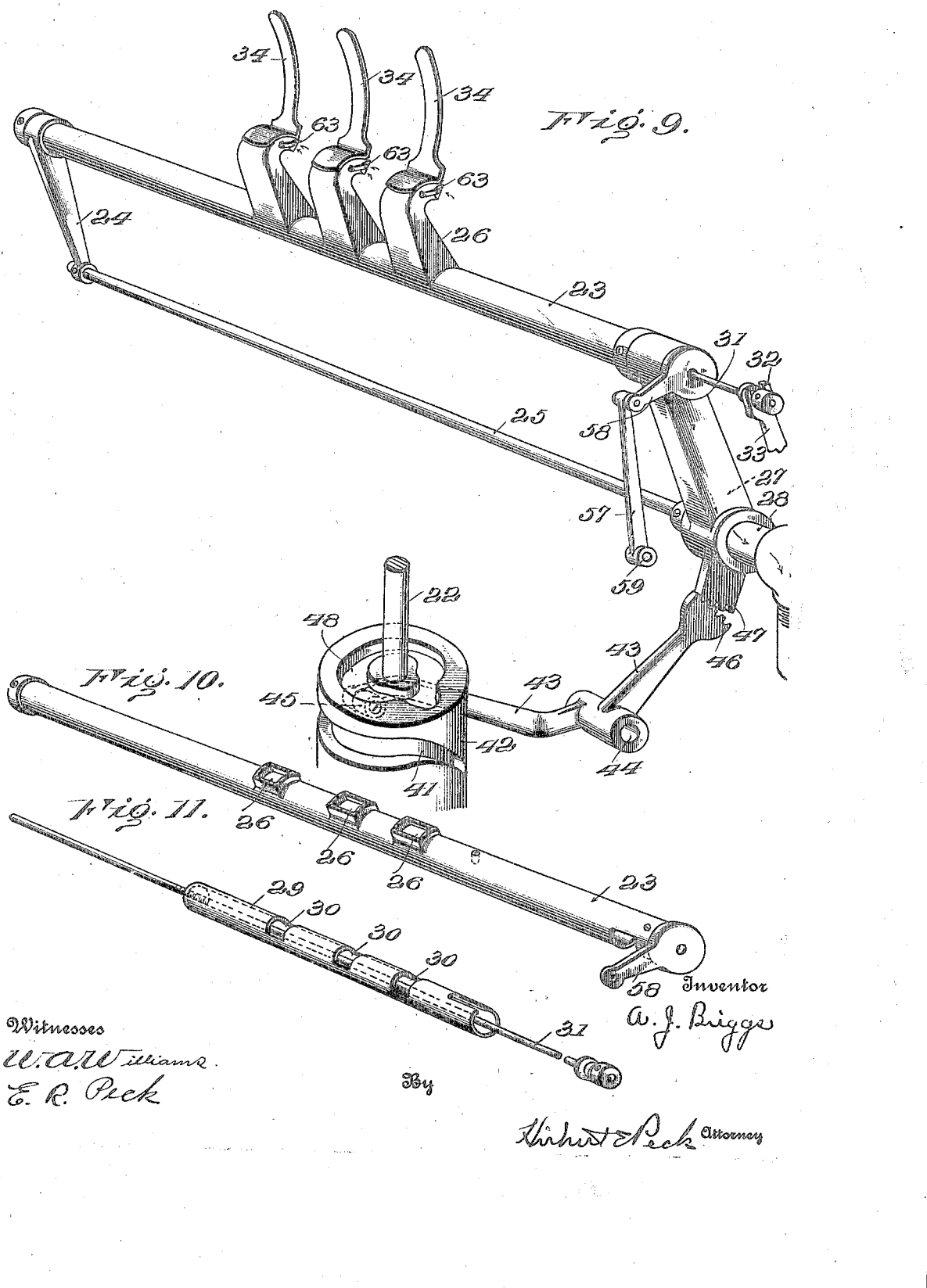
Witnesses
W. A. Williams
E. R. Peck
Inventor
A. J. Briggs
By Herbert Peck  Attorney

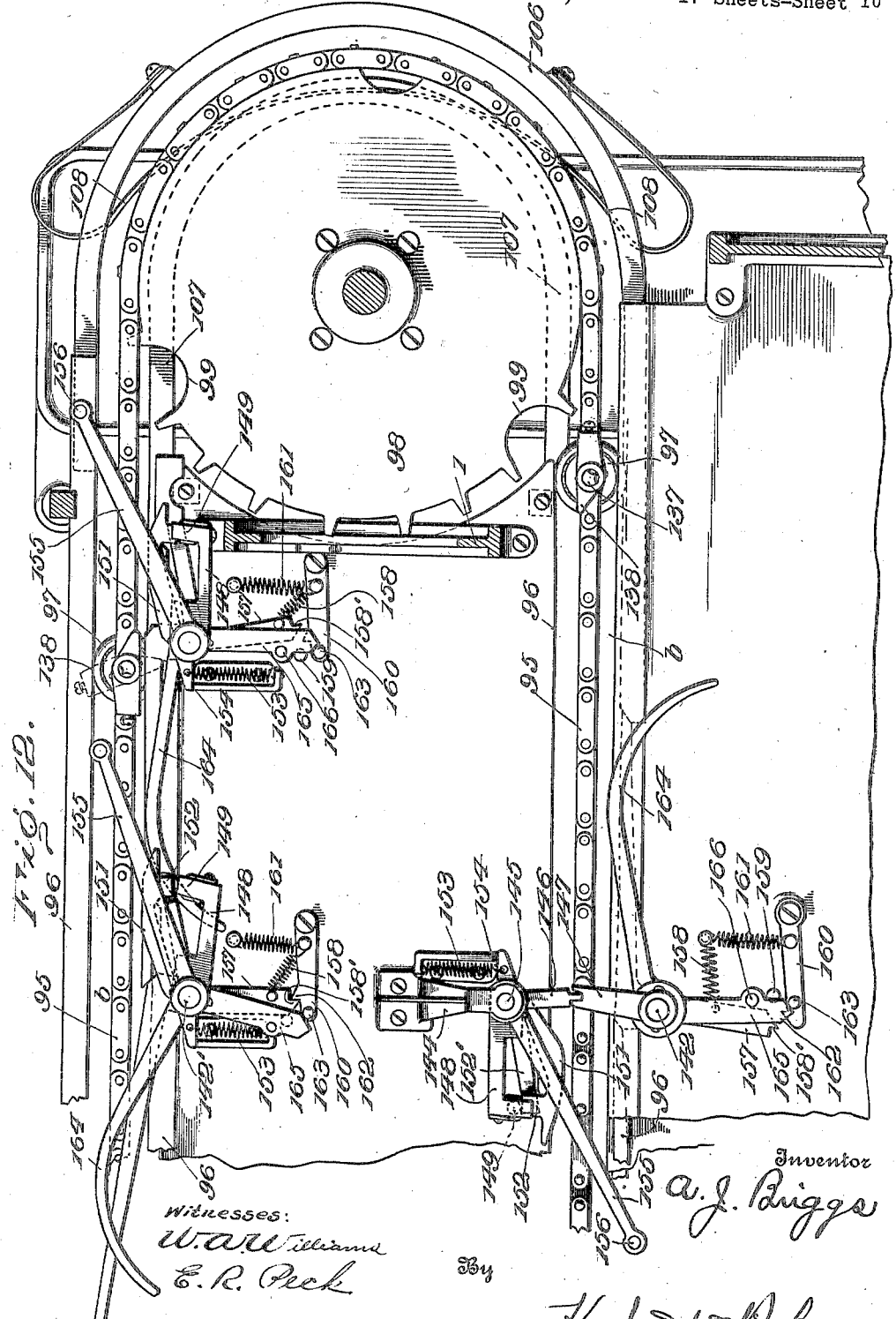

Apr. 24, 1923. 1,453,125
A. J. BRIGGS
MAIL DISTRIBUTING APPARATUS
Original Filed May 23, 1913 17 Sheets-Sheet 11
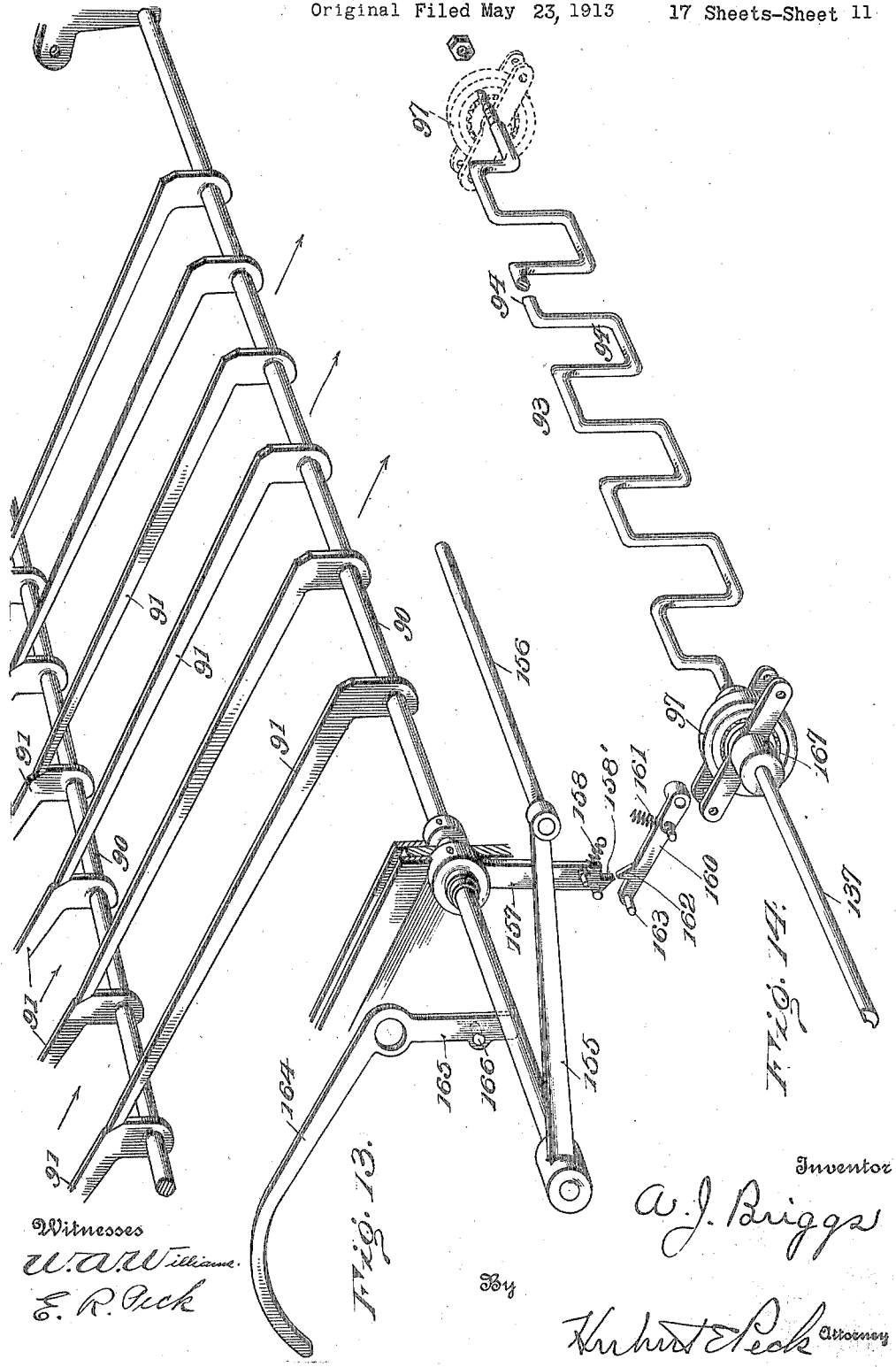

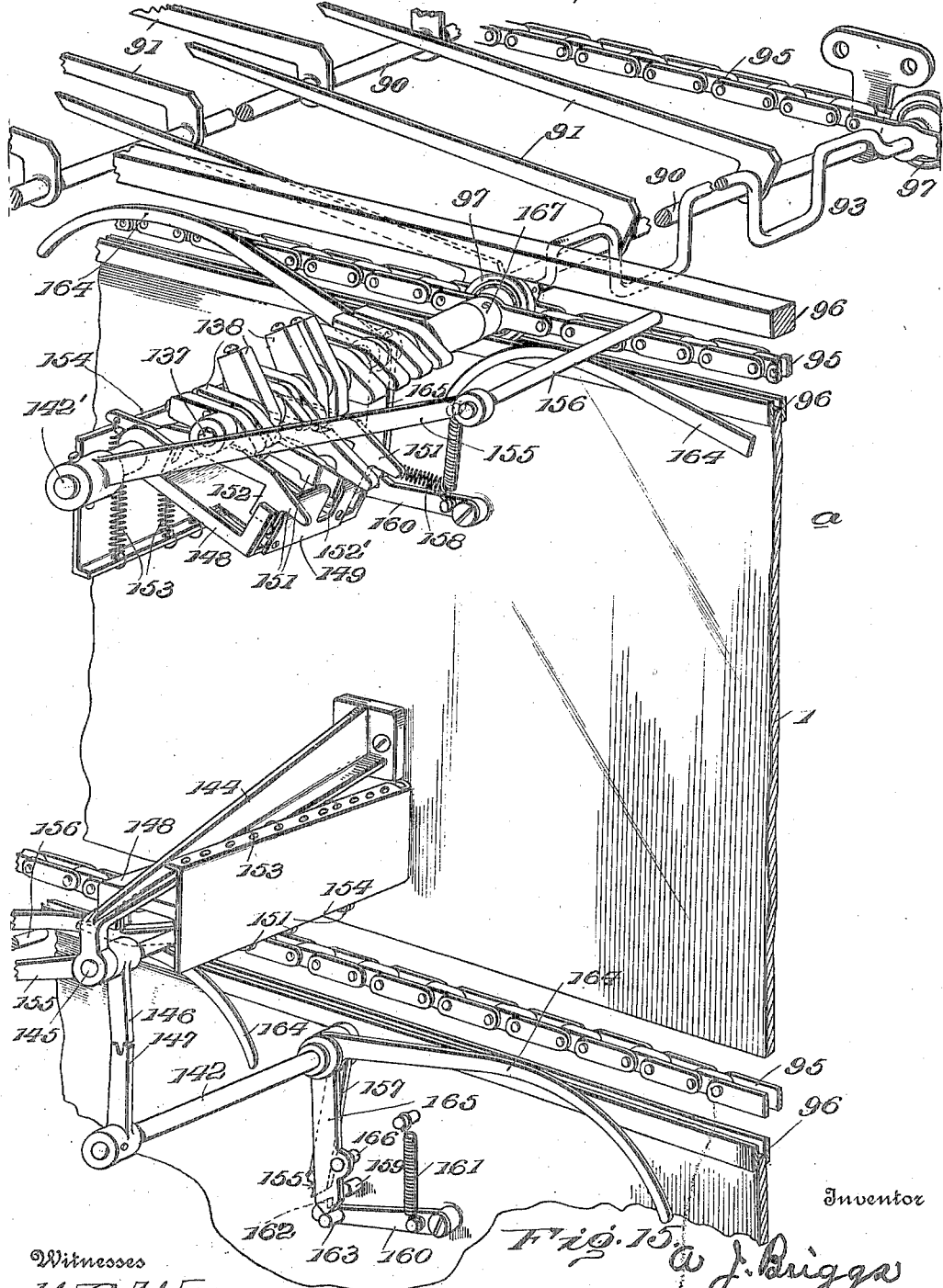

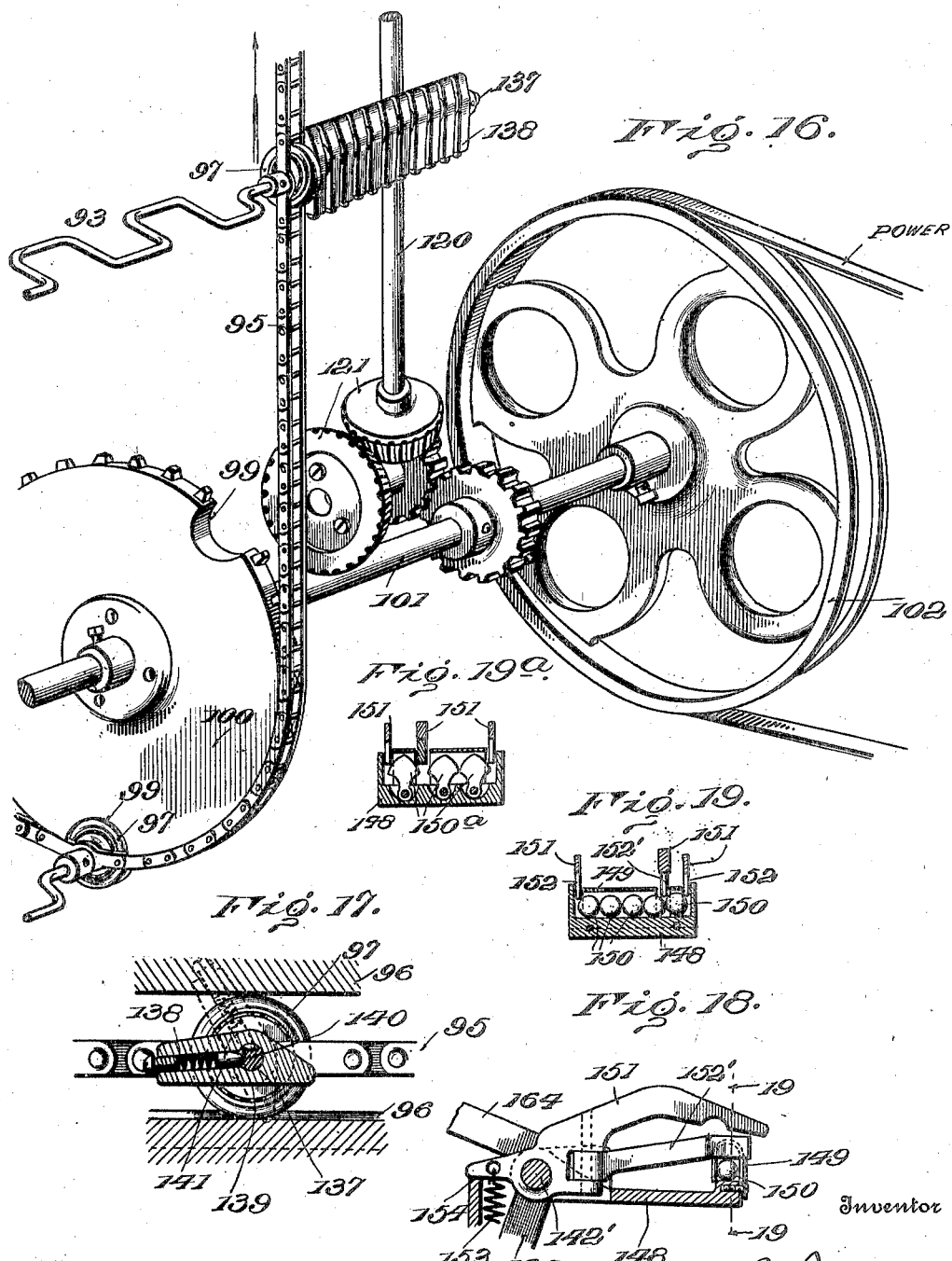

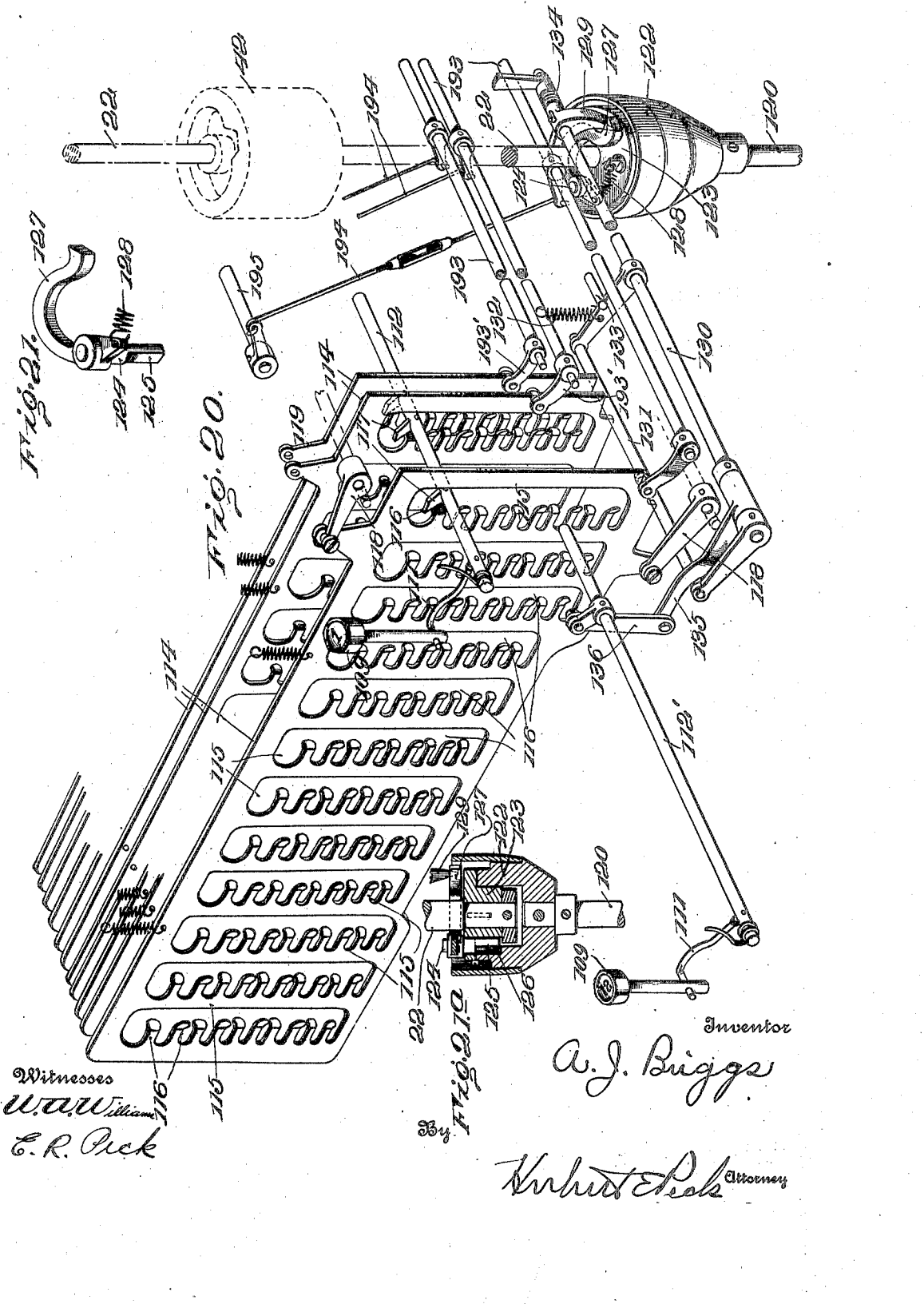

Apr. 24, 1923.
A. J. BRIGGS
MAIL DISTRIBUTING APPARATUS
Original Filed May 23, 1913    17 Sheets-Sheet 15
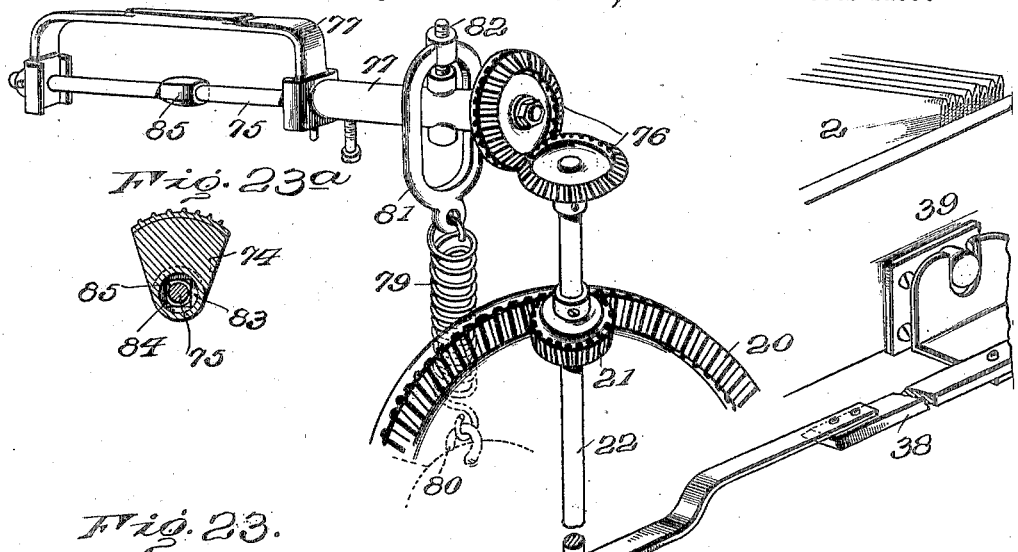
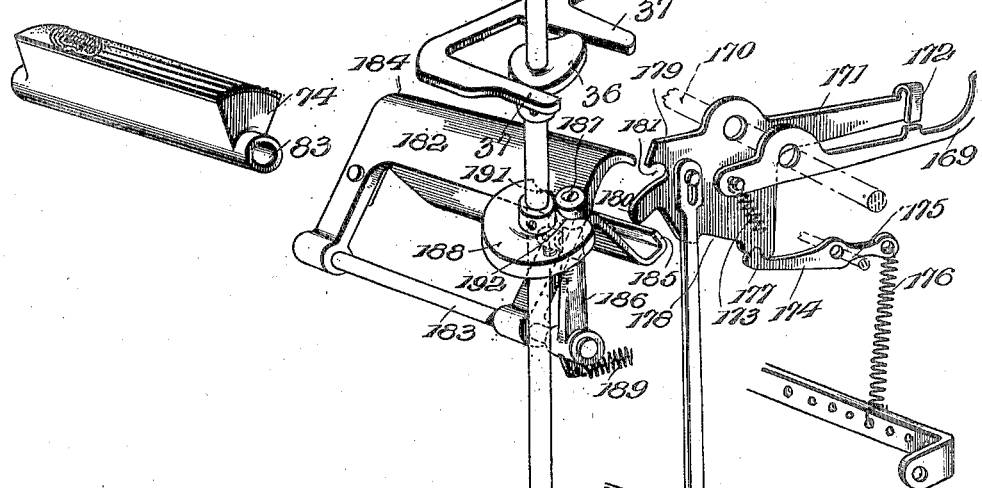

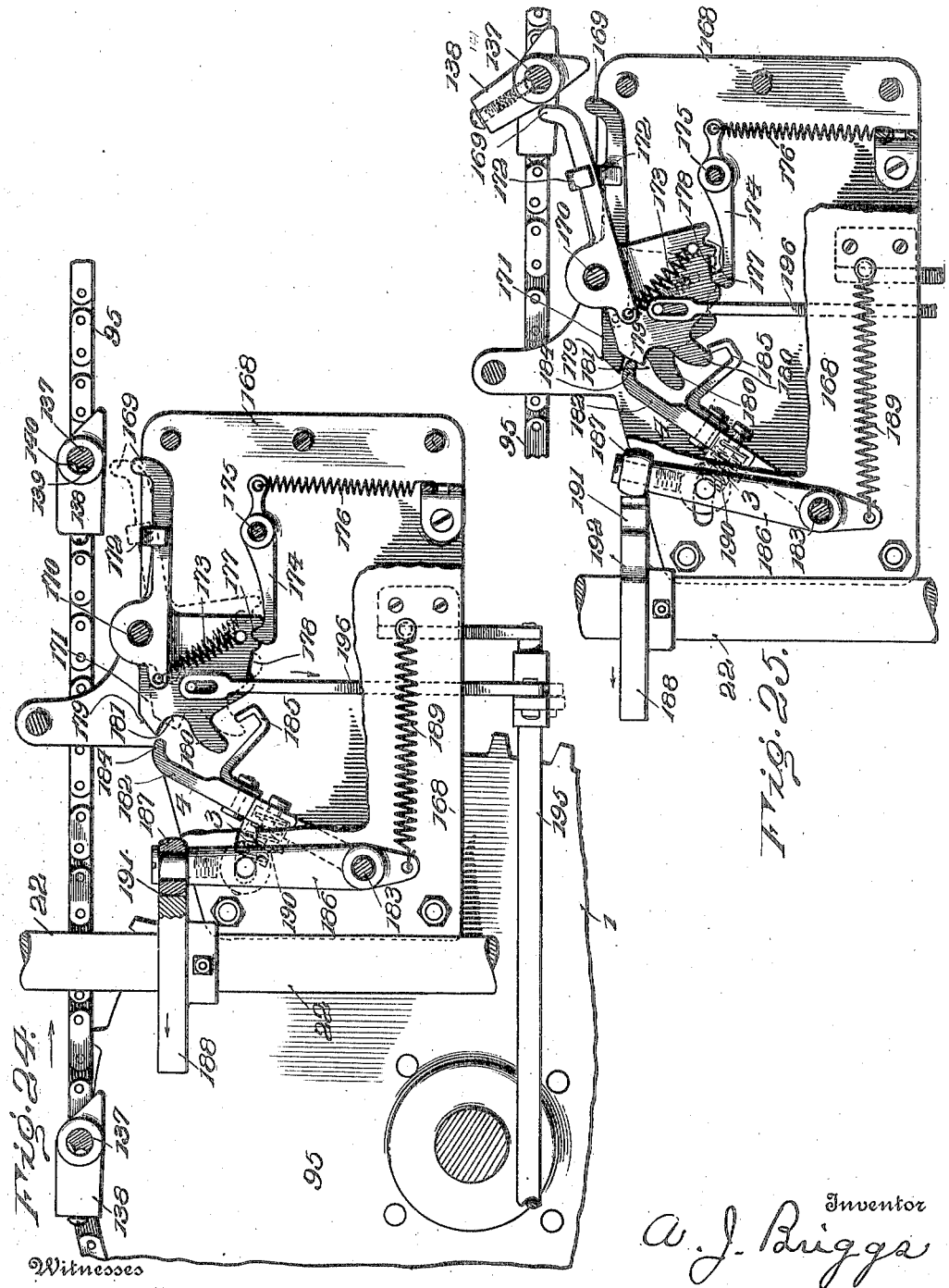

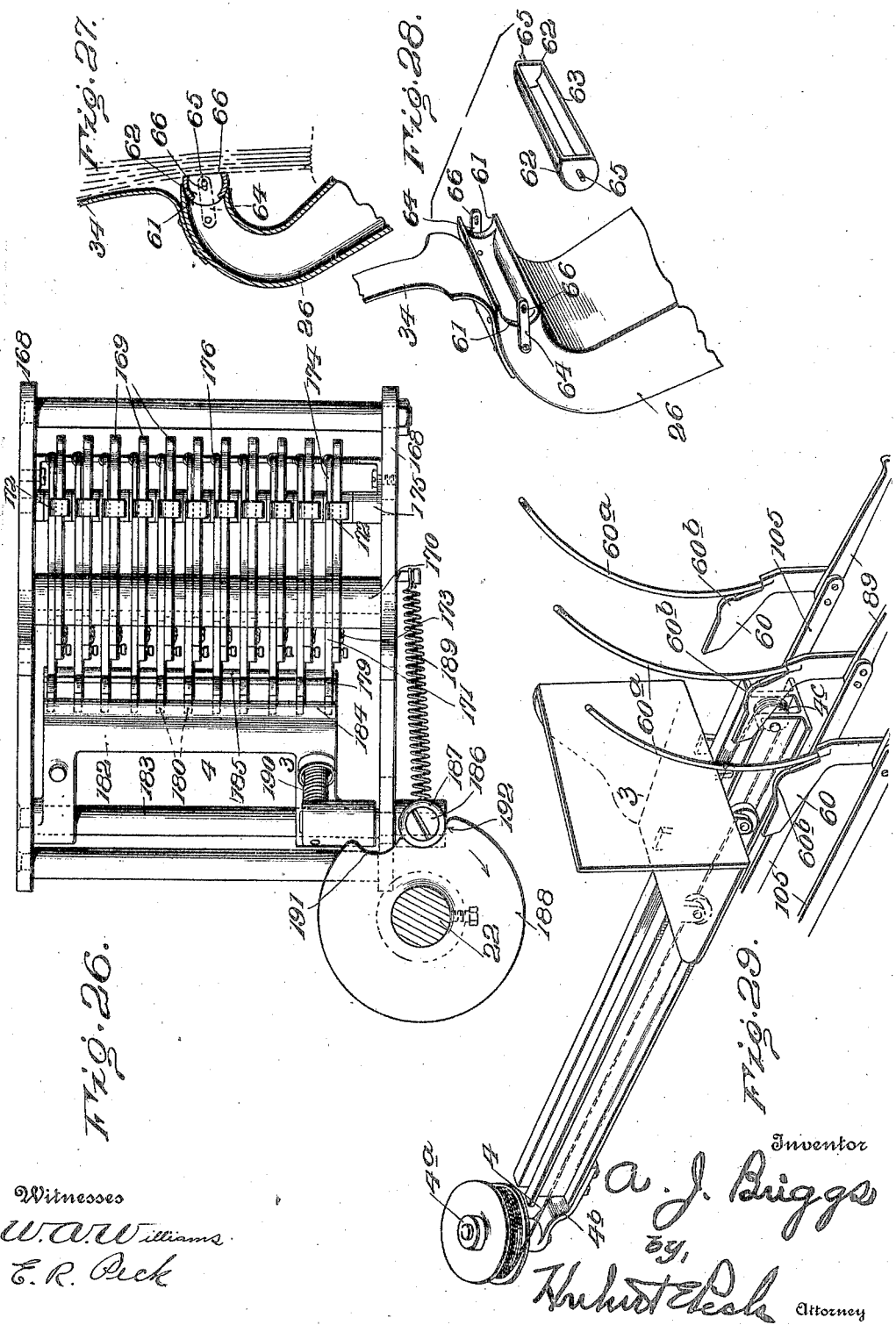

Patented Apr. 24, 1923.

1,453,125

UNITED STATES PATENT OFFICE.

ARTHUR J. BRIGGS, OF SYRACUSE, NEW YORK, ASSIGNOR TO THE AUTO MAIL DISTRIBUTER, INC., OF SYRACUSE, NEW YORK, A CORPORATION OF NEW YORK.

MAIL-DISTRIBUTING APPARATUS.

Application filed May 23, 1913, Serial No. 769,438. Renewed July 17, 1922. Serial No. 575,639.

*To all whom it may concern:*

Be it known that I, ARTHUR J. BRIGGS, a citizen of the United States, residing at Syracuse, in the county of Onondaga and State of New York, have invented certain new and useful Improvements in and Relating to Mail-Distributing Apparatus, of which the following is a specification.

This invention relates to certain improvements in mail distributing apparatus; and the objects and nature of the invention will be readily understood by those skilled in the art in the light of the following explanation of the accompanying drawings illustrating what I now believe to be the preferred embodiment, or mechanical expression, of my invention from among other formations, arrangements, constructions and combinations within the spirit and scope of the invention.

An object of the invention is to provide mail distributing apparatus wherein the letters, or other articles to be sorted or distributed, are positively moved and directed from the common source (the letter feed way receiving the common pile of letters to be distributed) to the points of destination, (the letter boxes or other receptacles) and wherein the letters can be successively removed from said common source as rapidly as the skill of the operator and the action of the apparatus permits and passed on to the distributing mechanism for delivery to the boxes without regard to the number of letters previously delivered to said distributing mechanism and then under the control thereof and in course of distribution thereby.

A further object of the invention is to provide mail distributing apparatus wherein the letter boxes or receptacles can be compactly arranged in horizontally-disposed superimposed rows for convenient removal of letters therefrom and to maintain economy in the use of valuable floor space, and to provide improved means for rapidly and efficiently distributing the letters to such boxes from a common source under the control of manually actuated means predetermining the box to which each letter is delivered.

A further object of the invention is to provide improved mail distributing apparatus wherein continuously moving letter conveying means is employed to positively propel the letters to all of the boxes of a distributing case and to provide said means with series of mechanisms for causing delivery of each letter into the box to which it is predestined by the operator.

A further object of the invention is to provide improved mail distributing apparatus wherein a continuously moving endless letter propelling device is arranged in the distributing case of boxes to carry letters to all of the boxes therein, said propelling device being capable of successively receiving letters at a common delivery point and of successively moving said letters forward one behind the other and spaced apart and of delivering said letters to boxes without regard to the order in which said letters were received by said propelling device, whereby said propelling device at any one time can be simultaneously propelling a large number of letters through the case of boxes.

A further object of the invention is to provide a mail distributing apparatus with comparatively simple, durable and positively-operating improved means for successively delivering letters from a common source to distributing means for delivering the letters to the predetermined boxes of a distributing or sorting case.

A further object of the invention is to provide mail distributing apparatus wherein the distributing case of letter boxes is provided with means to convey letters to all of the boxes of the case and with devices to cause delivery of any letter into any predetermined box of such case, said means comprising a series of spaced letter propelling elements continuously moving in succession through said case and each carrying devices for selecting the box to which a letter shall be delivered and for operating mechanism to cause the delivery of such letter into said box.

A further object of the invention is to provide improved mail distributing apparatus wherein mechanism is provided to successively take letters from a common source or pile and deliver them one at a time to means for conveying the same to the boxes of a distributing case, said means being capable of simultaneously conveying a large number of such letters and delivering to boxes without regard to the order in which the letters were delivered from the common source.

A further object of the invention is to provide certain improvements in construction, formation, arrangement and combination of parts and details whereby a highly efficient and improved mail distributing apparatus will be produced.

The invention consists in certain novel features in construction and arrangement and in combinations as more fully and particularly set forth and pointed out hereinafter.

Referring to the accompanying drawings:—

Fig. 1, is a side elevation taken from the rear side of the apparatus, a portion of the distributing case being broken away, letters being shown held by the various sets of letter holders of the rotatory turret at the various turret stopping points or stations, the selecting tumblers being shown in normal or inoperative positions, the gate operating and controlling means being also shown in normal positions.

Fig. 2, is a corresponding elevation of the front side of the apparatus, a portion of the distributing case being broken away.

Fig. 3, is a vertical longitudinal section through the distributing case, various parts of the apparatus being broken away, various gates being shown in open position to cause discharge of letters from the conveyer into the boxes controlled by such gates.

Fig. 4, is a front end elevation of the upper front end portion of the apparatus, the parts being shown in their normal positions.

Fig. 5, is a top plan view of the upper rear end corner portion (upper left hand portion of Fig. 3) of the distributing case, a letter being shown moving down between the curved end guide walls from the upper row of boxes to the next row below.

Fig. 6, is a vertical sectional view taken in the plane of the line 6—6, Fig. 2.

Fig. 7, is a detail elevation of the turret and adjacent parts, taken from the front side of the apparatus, certain hidden parts being indicated by dotted lines, the turret being shown carrying letters and in a normal position having just come to rest after an operative stroke or step.

Fig. 8, is a detail elevation taken from the rear side of the apparatus and by dotted lines showing the suction separating device in various positions with respect to the turret and letter way or bed.

Fig. 9, is a detail perspective view of the separator suction nozzles, the hollow shaft or casing carrying the same and the controlling devices therefor.

Fig. 10, is a detail perspective of said hollow shaft or casing, the nozzles being broken away.

Fig. 11, is a detail perspective of the hollow slide valve shown removed from said casing.

Fig. 12, is a detail elevation of the upper rear corner of the distributing case taken from the rear side thereof, showing one box gate open, and set up tumblers of the set that actuated the opening means of said gate, restored to normal position by the depressed tumbler-returning arm of said gate.

Fig. 13, is a detail perspective showing portions of a pair of adjacent box gates, with the gate closing arm separated from the gate shaft, the gate locking latch being also shown separated from its co-operating parts.

Fig. 14, is a detail perspective of one of the letter pushers separated from the endless sprocket chains.

Fig. 15, is a detail perspective view showing the operating means for a gate of an upper row of boxes and also the operating means of a box of the row immediately below, also showing a letter pusher and its box selecting tumblers set up to form the actuating combination for the operating means of said upper gate, showing said tumblers in the act of opening said box gate.

Fig. 16, is a detail perspective showing the endless-conveyer-driving connections at the lower corner of the front end of the apparatus, portions of the endless conveyer being shown.

Fig. 17, is a detail sectional view showing a portion of the endless conveyer and a pair of tracks for the wheels thereof, also showing one of a set of tumblers and the letter pusher end carrying the same, in section, dotted lines illustrating the tumbler in set up position.

Fig. 18, is a section through the rocking or operating means of a gate embodying three depressible contacts or levers, said section being taken in a plane at right angles to the gate shaft carrying said means.

Fig. 19, is a cross section through said means taken in the plane of the line 19—19, Fig. 18.

Fig. 19ª, shows a modification of the structure of Fig. 19.

Fig. 20, is a detail (more or less diagrammatical) perspective showing the driving and driven shafts and intervening clutch, the trip mechanism, several keys and their shafts, several vertically movable plates or frames actuated by said shafts and operative connections therefrom to said clutch, dotted lines indicating the cam groove for actuating the valve controlling the suction through the suction separating nozzles.

Fig. 21, is a detail perspective of the clutch pin and its controlling arm.

Fig. 21ª, is a detail sectional view of the clutch.

Fig. 22, is a detail perspective showing a portion of the driven shaft, the cams thereon for actuating the separator nozzles, for actuating the valve controlling the suction through said nozzles, for actuating the lock for the setting up fingers, and for reciprocating the letter way or bed, the gearing for actuating the turret, the printing head or roll, its mounting and the driving gearing therefor, a portion of the letter way and the means for reciprocating the same, a setting up finger and an adjusting rock shaft therefor from a plate or frame moved by one or more key rock shafts, and the lock for the setting up fingers and its controlling means.

Fig. 23, is a detail perspective view of the printing head or roll.

Fig. 23ª, is a detail section showing the rockable mounting of the printing head.

Fig. 24, is a detail vertical section showing portions of the setting up mechanism and endless conveyer and tumblers thereof, dotted lines indicating the position to which one or more fingers is or are adjusted by the depression of a key, full lines showing the normal positions of the parts.

Fig. 25, is a detail section showing parts of the setting up mechanism and endless conveyer, a setting up finger being shown elevated to operative setting up position by the lock and thus held, a tumbler being shown in set up position as though thrown to that position by said setting up finger.

Fig. 26, is a detail horizontal section showing the setting up fingers and lock therefor and the cam controlling the lock, in top plan.

Figs. 27 and 28, are detail views of the freely adjustable mouths of the suction nozzles.

Fig. 29, is a detail perspective view of the letter way (with the longitudinal floor and side wall thereof removed) and of certain parts that virtually form the letter discharge throat from said way.

My invention involves in whole or in part, apparatus wherein the letters are successively separated from a common source or pile of letters faced up for distribution, by a periodically movable suction separator and thereby delivered to a turret rotating with a step by step motion, or periodical stroke, whereby at each stroke the turret pushes a letter up from the common pile, presents a previously received letter at the inspection point where the operator can read the address thereof, and delivers another previously inspected letter at a letter station to be taken up by a compartment of an endless continuously moving letter conveyer consisting of an endless succession of letter compartments open at the top and bottom and successively passing said station and moving therefrom in succession over the open tops of every box of a distributing case of boxes wherein the boxes are arranged in superimposed horizontal rows with the open tops of the boxes normally covered by vertically swingable finger gates adapted to swing to opened position and direct letters from the compartments into the boxes. The gates form floors on which the letters in the traveling compartments slide, as the conveyer travels through the case along each row of boxes and from one row to the next, letter guide ways being provided at the ends of the rows and from each row to the next in succession.

A bank of keys or finger pieces is arranged at the front of the machine, each key corresponding to a box of the case. When the turret presents a letter at the inspection station, the operator presses a key corresponding to the box in which a letter so addressed should be deposited. The depression of this key throws certain mechanism into action to move the periodically-operating turret forward a stroke to drop said letter at said letter station so that it will be taken up by a compartment, also to push a letter up from the common pile, also to present another letter to periodically-operating imprinting mechanism timed to operate in certain sequence with said turret, to present a previously imprinted letter at the inspection station, and to receive a letter from the periodically-operated suction separator which is timed to operate in certain sequence with said turret.

The depression of said key also operates means for determining the particular letter box into which the letter will be deposited from said compartment.

Each box gate is provided with gate opening means capable of being actuated through sets of devices carried by the conveyer to forcibly open said gates by the forward movement of the conveyer. The conveyer provides a set of said devices for each letter compartment. Each gate opening means requires its own peculiar set up or combination of said devices, in order to be actuated thereby, and hence a series of setting up elements is provided common to all of said sets of devices carried by the conveyer which devices successively pass by said setting up elements as the conveyer compartments corresponding to said sets of devices move successively into letter receiving position with respect to said letter station. When the hereinbefore mentioned key is depressed said elements are operated to adjust the devices of the set corresponding to the compartment receiving said letter, to present the particular set up or combination required to actuate the particular gate opening means of the box in which said letter is to be deposited, and to freely and inoperatively pass by the gate opening means of all boxes preceding said particular box.

On the depression of a key, the suction separator makes an operative stroke and comes to rest, the turret makes a stroke and comes to rest, said setting up elements are adjusted and locked and are then unlocked and restored to normal position, all in readiness to again perform their operations on the depression of another key such as may be required by the address of the next letter appearing at the inspection station.

However, the letter conveyer is continuously moving and may be simultaneously propelling a large number of letters throughout the case and delivering letters without regard to the order in which it received said letters. When a set of devices actuates a gate to open position and the letter is delivered into the box thereof from the compartment represented by said set, the conveyer closes said gate and also means moving with the gate has returned the set up devices of said set to normal inoperative position.

In the particular example illustrated, I show a suitable upright framework 1, carrying letter boxes a, of the distributing case and supporting the working parts of the apparatus. In this example, the letter boxes a, are arranged in superimposed horizontal rows. The boxes have letter ingress openings at the top and the front ends of the boxes are open for the removal of the letters distributed thereinto. The rows of boxes are arranged as closely together as possible to attain compactness and yet permit the operation of letter moving mechanism between the rows to convey letters in the letter passages b, longitudinally of the rows of boxes and over the open tops of the boxes, all as will be hereinafter more fully set forth.

I show a feed way or hopper 2, for the common pile of letters to be distributed into the case of boxes, arranged horizontally on top of the frame work 1, and extending to the front end portion thereof. This feed way is in the form of a trough or platform open at the top and front end and usually at the front side and provided with a follower 3, constantly being pressed forward by flexible connection 4, to feed the pile of letters forwardly in said way toward the open front end thereof. This way is movably supported on the frame work by rollers 5, or other means, to permit limited longitudinal reciprocation thereof.

I show a spring actuated drum 4ª (carried by bracket 4ᵇ) constantly acting to wind the cord 4, thereon. The cord extends from the drum longitudinally of the hopper through a slot or passage therein to a pulley 4ᶜ, at the front end of the hopper and from thence rearwardly to the follower so as to constantly act on the follower to pull the same forwardly.

The letters to be distributed are faced up on a suitable table and arranged in a horizontal pile, and are then placed in the way (see Fig. 2) with their lower longitudinal edges resting on the floor of the way and their rear ends lined up against the inner or rear side wall of the way. In this instance, the letters are arranged in the way with their addressed faces to the rear and the stamps at the lower end or rear corners thereof.

Mechanism is provided to successively receive the letters from the front end of said way and present the same to imprinting means, and then bring the imprinted addressed face of the letter into position for inspection or reading by the operator, and then deliver the imprinted inspected letter to means for distributing the same to the box indicated or predestined by an action of the operator performed while the letter was held in position for his inspection.

In the present example I show a horizontally-arranged vertically-rotatory hollow drum, head or turret arranged in advance of the open front end of the feed way and carried by and rotating with a horizontal shaft 8, arranged transversely with respect to the feed way and carried by standards or pillars 9, fixed to and rising from the frame work. This transversely arranged turret is hollow and open at one end and consists of an end head or spider 7, fixed to one end portion of the shaft 8, near the rear side of the machine, and a concentric circumferential portion at one end fixed to said head and projecting therefrom toward the front side of the machine and longitudinally with respect to shaft 8, and this circumferential portion consists of parallel longitudinal bars 7', carried by said head and at corresponding ends fixed thereto and at their opposite or free ends secured together by ring 7'' about the open end of the turret. This turret carries uniformly spaced and arranged letter grips, clamps or carriers arranged to be successively brought into operative relation with respect to the foremost letters in said way as the turret rotates. For instance, I show letter clamps or carriers arranged on the longitudinal bars or circumferential portion of the turret. Each bar can be provided with several parallel letter clamps spaced longitudinally thereof, each clamp being arranged transversely of the bar and at the outer side thereof. Each clamp, in this particular example, consists of a fixed jaw 10, secured to a bar of the turret and projecting outwardly therefrom, radially with respect to the turret, and a swingable jaw 11, at one end fulcrumed at 12, to the fixed jaw with its free end yieldingly held inwardly to the outer surface of the fixed jaw by any suitable means such as spring 13, usually concealed within the fixed jaw. The spring-held jaw can consist of sheet metal having side flanges 14, lapping the side faces of the fixed jaw and terminating short of the free end of the spring-held jaw to engage the longitudinal edges of the letters and limit the distance the letters enter between the jaws.

Each movable jaw or clamp is provided with means for swinging the same to open position for receiving and discharging letters. For this purpose, I show each clamp provided with elbow lever 15, arranged at the side of its fixed jaw and fulcrumed thereto at 16, and having its free end projected inwardly and approximately radially, and carrying roll 17, to engage fixed cam plate or track 18, arranged within the turret and suitably secured to the intermediate pedestal 9.

At a point intermediate its ends the elbow lever is formed with a point or projection 19, bearing against the edge of a flange 14, of the spring-held jaw. When the roll on the free end of the elbow lever rides on the cam, the lever is swung outwardly and thereby swings the jaw (clamp) outwardly to open position against the tension of its spring and the clamp is thus held open until the roll leaves the cam, thereupon the spring snaps the clamp back to closed position. Each bar of the turret can be provided with one or more letter clamps, although in the particular example illustrated I show three spaced clamps arranged in a row on each bar to virtually act as one in grasping the edge of a letter. I show the turret provided with five equally spaced longitudinal bars and consequently provided with five rows of clamps and these rows of clamps are successively brought to position to successively receive letters from the front end of the letter way.

The turret is rotated in a direction to move rearwardly and upwardly from the bottom and forwardly and downwardly from the top and the letter clamps all face forwardly with respect to the direction of rotation of the turret, i. e., the front ends of the clamps are the free or letter grasping ends thereof. The turret is so arranged with respect to the feed way that the clamps move upwardly approximately through the front end of the feed way to receive the lower longitudinal edge of the foremost letter in said way and to push said letter upwardly from said way and carry the letter upwardly and forwardly at the top of the turret and down at the front thereof thereby reversing the letter so that its addressed face will be exposed right side up at the front of the turret. As the turret continues its movement, the letter will be carried downwardly and rearwardly below the turret, and the clamps will be then opened and the letter dropped into the distributing devices below the turret. The cam 18, is arranged to engage the elbow clamp-opening levers as the clamps pass down to letter discharging position and to hold said clamps open as they pass to the letter receiving position, and to release the levers when the clamps have received the letter and pass beyond the letter receiving position, so that the clamps will then snap to closed position gripping the letter firmly by its lower edge and holding the same in proper position.

The turret moves with a step by step motion. In the particular example illustrated, five strokes or steps are required to perform a complete revolution and carry a row of clamps from letter receiving position step by step around the circle and back again to letter receiving position. The turret is rotated through the medium of gear wheel 20, fixed on the rear end of its shaft beyond the rear pedestal 9, and meshing with a pinion 21, fixed on upright drive shaft 22. The arrangement is such in this example, that a complete revolution of shaft 22, will propel the turret one step or a complete stroke to carry each set of clamps forward through an arc of approximately 72°.

Suitable means are provided to separate the foremost letter in the feed way from the remaining letters in said way and deliver the same to the open upwardly moving letter clamp with the ends in view of preventing the clamp grasping more than one letter at a time at the letter receiving position, and insuring the presence of a letter at the letter receiving position to be grasped by a clamp, at each stroke of the turret.

In the particular example illustrated, I provide a pneumatic suction device extending to a point in advance of the foremost letter in the feed way and arranged to move rearwardly into operative relation with respect to the lower portion of the front face of the foremost letter, and then move forwardly carrying the lower portion of said letter forwardly and bending or separating the same from the letter behind and holding said lower edge in the path of the upwardly moving open letter clamp, and then release said letter from the suction approximately when the clamp closes on and grips the letter.

The particular pneumatic device shown for delivering the letters one at a time, to the clamps of the rotary turret, comprises a horizontal hollow rock shaft, pipe or casing 23, arranged transversely of the frame work immediately below the front open end of the feed way and carried by and mounted to rock in the upper ends of radial rock arms 24, extending upwardly from and carried by transverse shaft 25, supported in the frame work and constituting the axis on which said arms rock. The shaft 23, is provided with a suction nozzle 26, projecting upwardly therefrom and secured thereto and having its free or upper end hooked, curved, or otherwise deflected rearwardly so that the nozzle is approximately of a goose-neck formation, with its rear end terminating in an open rearwardly facing suction mouth. The hollow shaft can be provided with one or more nozzles 26, although in the present instance, I show the same provided with three similar nozzles 26 projecting in the same direction and spaced apart and arranged so as to move and lie in different vertical planes from those in which the clamps of the rotary turret revolve, whereby the suction nozzles can move forward between said clamps and the clamps can move upwardly between the nozzles. The interiors of these nozzles through their lower ends are in suction communication with the interior of the shaft 23 (when the mouths of the nozzles are in action) and the interior of said shaft is in operative suction connection with any suitable air exhausting device or pump (not shown) through air passage 27, arranged longitudinally of and in one of the arms 24, and air exhausting pipe 28, opening into said passage concentrically with the axis on which said arm rocks and leading to the air pump.

The nozzles are cut off from and are opened to operative connection with the air exhausting device, at certain points in their operative stroke to release and grip letters, by suitable means. For instance, I show a hollow or tubular slide valve or cut-off 29, longitudinally and snugly fitting and movable in the shaft 23, and at one end constantly open to suction communication with the interior of said shaft and having radial ports 30, adapted to register with the radial openings in the shaft to the lower or inner ends of the suction nozzles to place said nozzles in open communication with the air exhausting pump. Said valve is adapted to be moved longitudinally in said shaft to close the inner ends of said nozzles and cut said nozzles off from communication with the air pump, by throwing the ports 30, out of registration with the inner ends of the nozzles to close said ports by bringing them opposite blank or imperforate portions of the wall of the tubular shaft. The valve is longitudinally moved to bring the ports 30 to and from registration with the nozzles to open the nozzles to and cut the same off from the air exhausting device, by suitable means, such as central longitudinal valve rod 31. projecting to the exterior of one end of the shaft and at its exposed end provided with spaced annular stops between which the forked upper end 32, of a laterally movable lever arm 33 loosely fits to move the valve stem and valve longitudinally of the hollow shaft or valve casing 23.

When the suction device and feedway are at rest in normal positions, the arms 24 and suction nozzles are at their limits of forward movement with the nozzles arranged between the clamps of the row in front of the feed way, and the valve 29, is in closed position so that no air is being drawn in at the suction mouths. (See Fig. 7). When the parts mentioned are thus at rest in normal positions, and the turret is also at rest, said row of clamps will be in closed position grasping the lower edge of a letter delivered to them by the previous operation of the suction nozzles. If the shaft 22 should now begin to rotate to actuate the turret on a stroke or step, the row of clamps holding said letter will move upwardly, pushing said letter up from the open front end of the letter way and from the rearwardly facing mouths of the suction nozzles and longitudinally of and along the rear faces of letter guide and stop fingers 34, fixed to and projecting upwardly from the suction nozzles. The turret will come to rest at the completion of this stroke with said letter raised entirely clear of and above the letters in the letter way and in an upwardly and forwardly inclined position at the rear top portion of the turret and under a letter shield and guide 35, fixed to parts rigid with the frame work.

The curved letter stop and guide fingers 34, can be composed of flexible sheet metal at their lower ends fixed to the nozzles so as to form upward continuations of the rear portions thereof. While the said clamps are moving upwardly to push the letter grasped thereby up from the common pile of letters in the feed way, the feed way is in rearward position to relieve the letter being moved up by the clamps, from the forward pressure and friction of the pile of letters in the feed way which might otherwise interfere with the free withdrawal of the letter from the stack or tend to cause the letter immediately between the one being withdrawn to move upwardly therewith.

The longitudinal movement of the letter way is timed and accomplished by a peculiarly shaped horizontally-disposed cam 36, fixed on the shaft 22, and arranged within and having edge driving engagement with an approximately encircling yoke, 37, carried by a reciprocatory horizontally-disposed pitman 38, arranged longitudinally of the feedway and at its rear end coupled thereto at 39, to longitudinally move the feed way as the pitman is reciprocated by the cam.

After the said clamps have pushed the letter carried thereby up past the suction mouths of the nozzles, and before the turret completes said step or stroke, the arms 24, are swung rearwardly carrying the hollow shaft rearwardly with its nozzles, and thereby pressing the suction mouths of said nozzles rearwardly against the front face of the lower portion of the foremost letter in the feed way. While the nozzles are thus forced rearwardly against the foremost letter in the feed way, said way is being forced forwardly by the cam 36, to press the letters forwardly and insure the proper engagement of the foremost letter and suction mouths to bring said letter completely within the range of action of the reduced pressure within said nozzles. The frame work sides provide openings 40, in which the shaft or valve casing 23, is movable toward and from the turret: The limits of said movement being controlled by a cam 41, and link 57, hereinafter described.

This swinging movement of the valve casing 23, and its nozzles is effected and properly timed by the encircling or continuous cam groove 41, formed completely around the circumference of the cam or cylinder 42, arranged concentrically on and fixed to the shaft 22, said cam groove acting on the said valve casing through a suitable lever mechanism. For instance, I show a vertically rockable elbow lever 43, fulcrumed at 44, intermediate its ends to the frame work and at its front end carrying lateral stud or roller 45 fitting in the cam groove 41 and at its opposite end having upright toothed sector 46 meshing with toothed sector 47 rigid with and depending from one of the arms 24, carrying valve casing 23. When the roller 45 is depressed by the cam groove 41 of the rotating cam cylinder 42, the lever 43, is rocked to swing the valve casing 23, and its nozzles rearwardly against the letters in the feedway, and when the roller 45, is elevated by the cam groove the valve casing and its nozzles are carried forwardly toward the turret. When the roller 45, occupies horizontal portions of said cam groove the valve casing and nozzles are held against fore and aft movement. One revolution of the cam 42, causes one complete stroke of the nozzles rearwardly from normal position to secure a letter and then forwardly back to normal position to deliver said letter to the turret, and the cam groove 41, is so arranged that the movements of the nozzles will be properly timed with respect to the movement and position of the turret letter clamps during each stroke thereof.

The mechanism for moving the valve 29, to open and close the nozzles to and from the air exhausting means, is actuated and timed by an annular or encircling cam groove 48, in the upper end of the cam cylinder 42, so that said nozzles are shut off from the air exhausting means while at rest in their normal advanced positions, and will be automatically cut off when they have reached that point in their forward movement where the letter carried thereby has entered or approximately entered the open clamps of the turret at the letter receiving position, and so that the nozzles will be opened to the air exhausting means on their rearward stroke to take hold of the letter and will remain open on their forward strokes carrying the letter to position where the letter is released and delivered to the clamps.

Any suitable mechanism can be provided for moving said valve although in this example, I show the arm 33, forming part of an upwardly projecting crank arm from a rock shaft 49, arranged at right angles to the length of said valve and suitably mounted in journal boxes carried by a side of the frame work and formed with an inwardly extending lateral arm 52, at its inner end geared at 53, to the laterally extending arm of a bell crank 54, mounted to rock on a horizontal fulcrum 55, and provided with roller 56, at the end of its depending arm and confined between the vertical walls of the cam groove 48. The cam groove 48 is formed with portions concentric with the shaft 22, to hold the valve for the desired length of time in open position and with one or more offset portions to move the valve to closed position. It is obvious that the inward or outward deflection of the vertical walls of said groove will move the roller 56, laterally and thereby swing the lever 54, to rock shaft 49, through the medium of gearing 53, and arm 52, in a direction to swing the crank arm 50, 33, toward or from the valve to move the same longitudinally. The crank arm 50, 33, comprises the section 50, rigid with shaft 49, and the upper section 33, pivotally joined to section 50, by hinge or pivot 51, to permit upper section 33, to swing fore and aft with the shaft or valve casing 23, on the axis 25. The pivot 51 is approximately alined with said axis 25.

The cam or cylindrical block 42, having cam grooves 41, and 48, and the cam 36, are actuated by the one shaft 22, which also has direct driving connection with the turret, and these various parts are arranged to time and operate the suction nozzles, the valve, the feed way and the turret in certain fixed relations and sequence so that said parts will co-operate to attain certain results.

In this connection, however, attention is called to the fact that I do not wish to limit myself to the particular operating mechanisms disclosed, nor in fact to the particular valve mechanism described, nor to the use of the particular pneumatic means in connection with any particular turret or other letter carrying or feeding device, nor do I wish to limit the turret to use in connection with any particular construction of letter separating device or other means for delivering letters thereto.

I, preferably, provide the shaft or valve casing 23, with means to rock the same in the journal boxes provided therefor in the radial or rock arms 24, as said arms swing fore and aft so as to cause the suction nozzles to swing vertically on the axis of casing 23, as a center.

In the particular example illustrated, the rocking action of the valve casing 23, and nozzles is caused by an upright link 57, at its upper end pivotally joined to the free end of a short forwardly projecting arm 58, rigid with the valve casing, and at its lower end pivotally joined to a side of the frame work to rock about fixed pivotal point 59. The pivotal point 59 is arranged a distance in advance of the axis 25, from which the valve casing swings, and it is obvious that as the valve casing moves rearwardly on its letter securing stroke, said link will cause the arm 58 to swing down and the nozzles to swing forwardly while the nozzles will gradually straighten up as they move forwardly on their letter feeding or separating stroke, see Figs. 8 and 9.

The letters pass forward from the front end of the floor of the feed way or hopper onto the upper longitudinal edges of several spaced parallel stationary floor strips or edge-wise arranged plates 60. These strips 60, are arranged in forward longitudinal continuation of the floor of the feed way and their rear ends break joints with the front end of the floor of said way (as by projecting rearwardly into longitudinal slots therein) so that the feed way can freely reciprocate and yet the lower edges of the letters can easily slide forward from the floor of the way onto the longitudinal top edges of said strips.

The strips are fixedly supported in any suitable manner. For instance, I show the strips at their lower ends fixed to a stationary portion of the apparatus, such as bars 105, and extending vertically therefrom with their rear ends extended rearwardly. Intermediate the lengths of their top letter-receiving edges, said plates or strips 60, are formed with the curved or rounded upward letter stop or separating bulges 60ᵇ, while at their front portions, adjacent to, or between the paths of the turret clamps, said plates or strips have the lower ends of curved upwardly projecting letter guiding and stop fingers 60ᵃ, fixed thereto and supported thereby. The arrangement of the suction-nozzle-rocking link 57, with respect to certain other parts, is such that on the forward movement of the valve casing 23, said nozzles will be rocked or swung vertically in a manner to move the letter being carried forward thereby over and approximately clear of the stop or separating bulges 60ᵇ, until said letter reaches its limit of forward movement against the stop and guide fingers or wires 60ᵃ, and in position to be grasped by the turret clamps moving upwardly between wires 60ᵃ, which in connection with the suction mouth fingers 34, virtually form the front "fence" or wall of the feed way or hopper as well as a guide for the letters while being carried up from the letter way by the turret.

The suction nozzles virtually swing upwardly in carrying the foremost letter forward and bend or lift the lower portion of the letter over the bulges 60ᵇ, and hence separate the same from the remaining letters of the common pile which are held back by engagement with said bulges. The letters behind said foremost letter are being constantly urged forward by the spring actuated follower, but said bulges hold the same back from the foremost letter and afford space for the free movement thereof while being pushed up by the turret clamps. The separating action is aided by the fingers 34, of the nozzles which press back the upper portions of the letters.

The initial separation of the foremost letter from those behind it is materially aided by the peculiar action of the nozzle in bending the lower edge of the letter forward or in causing the letter to assume a tilted position.

I preferably provide each nozzle with an automatically rockable letter engaging section or mouth freely movable vertically to conform to the surface or face of the letter held thereto and thereby insure the grip of the mouth on the letter against accidental detachment of the letter by reason of inequalities in the face or surface thereof. For instance, I show the vertical side edges of the free or suction ends of the nozzles concaved or formed with approximately semi-circular notches 61, to receive the corresponding convexed or semi-circular ends 62, of supplemental or oblong open mouths or letter engaging sections 63, having straight flat letter engaging rear edges. These mouths are loosely confined in or to the nozzle ends by side plates 64, fixed to the nozzle side walls and projecting forwardly beside the ends 62, which have pins 65, confined in slots or perforations 66, in said plates. This supplemental mouth is free to rock vertically in the socket formed in the nozzle end (by the rounded depressions and by beveling the inner faces of the top and bottom edges of the nozzle end) in adapting itself to the face of the letter held thereto so as to maintain itself parallel with the face of the letter to insure the tight adherence of the letter to the nozzle and to prevent such leakage of air into the nozzle as to permit accidental detachment of the letter from the nozzle.

I provide suitable mechanism for imprinting each letter while being carried by the turret from the feed way to the distributing devices. This printing device is usually utilized for the purpose of canceling the stamps on the letters and applying the postmarks thereto, although of course the printing device can be utilized for otherwise imprinting the letters or other articles being carried forward by the turret.

In this particular example, I show the printing device arranged to receive and act on each letter as it passes over the top of the turret from the letter station at the upper rear part of the turret to the letter station at the upper front part of the turret.

The printing mechanism consists of a rotary printing couple, the printing element or die thereof being arranged above the turret, and the impression element thereof being arranged below the die and within the turret, although mounted separately. The impression element consists of a relatively-short rotary impression roll 67, arranged immediately above and parallel with the axis about which the turret rotates. This impression roll or surface is carried by a shaft 68, projecting beyond the ends of the roll and at one end mounted in and supported by pillar 69, and at its opposite end mounted in a gear box housing 70, enclosing the gearing 71, whereby said shaft 68, is geared to and rotated by the turret shaft 8.

In the particular example illustrated, this gearing requires rotation of the impression roll in the same direction as the turret and at the same peripheral speed. The gear box 70 and the pillar 69, are arranged vertically within the turret, and said box and pillar are rigid with and carried by a fixed horizontally-elongated housing or sleeve 72, at one end fixed to and supported by the front side pedestal 9, (at the left Fig. 6) and longitudinally receiving the shaft 8, carrying and driving the turret. This fixed sleeve or housing 72, encloses the shaft 8, approximately throughout its length with its rear end terminating a sufficient distance from the right hand pedestal 9 (Fig. 6) to allow space between the end of the housing and said pedestal for the end head or spider 7 of the turret. This impression roll is divided into two diametrically-opposite similar impression surfaces of the same radius and concentric with the axis of rotation, by two diametrically-opposite similar concavities or concaved depressions 73, and the impression roll is so timed with respect to the turret that when rotating the rows of letter clamps of the turret will register with and enter said depressions and hence not interfere with the impression roll, and the letters carried by said clamps will overlie the impression surfaces in position to be imprinted, as clearly indicated by Fig. 7.

The rotary sector-shaped printing member or die 74, is arranged above and parallel with the impression roll and turret and is carried by horizontal shaft 75, driven by shaft 22, through the medium of bevel gearing 76, designed, in this example to cause rotation of the die so that its printing face will register with the impression surfaces of the impression roll, successively, on each rotation of said roll, and with approximately the same surface speed as said surfaces and the advancing letter. The die is timed to register with the rear portions of each impression surface. The shaft 75 is mounted in and carried by a vertically swingable hanger or bracket 77, mounted in the upper end of rear side pillar or pedestal 9, to swing on the transverse or horizontal axis 78, see Fig. 4. The bracket is yieldingly held to its limit of downward movement by a suitable spring device, such as coil spring 79, at its lower end suitably secured at 80, and at its upper end confined to the lower end of a yoke 81, encircling the bracket 77, and vertically adjustable with respect thereto to adjust the tension of the spring thereon by set screw 82.

The shaft 75 is longitudinally removable from its hanger 77, and the die is formed with a hub having an enlarged longitudinal bore 83, extending completely therethrough and at the center of its length having contracted portion 84, approximately square in cross section and flaring or enlarging in opposite directions from its center toward its opposite ends to receive an enlargement 85, rigid on the shaft 75, and approximately square in cross section and longitudinally reducing from its central portion in opposite directions toward its ends. The bore of the die is of sufficient size to permit the shaft enlargement to slip freely and longitudinally thereinto and to enter the bore contraction 84, and the abutting approximately flat faces of the enlargement 85, and contraction 84, will constitute the coupling whereby the shaft rotates the die but the formation of the shaft and die bore will permit the die to rock on the shaft in adjusting or adapting itself to uneven letters in imprinting the same.

As the turret is making a stroke, the front long edge of a letter advancing from the rear top portion of the turret will pass over the front edge of a forwardly moving impression surface of the impression roll and will be guided down thereto by the front edge of letter guide 35, and by the time the rear portion of said letter has moved to a point beneath the die, said die in its rotation will have reached printing position and will co-operate with said impression surface in imprinting the stamp canceling and postmarking imprints on the desired portions of the letters. The die and impression surface rotate or move along with the advancing letter and by the time the clamps carrying said letter reach the impression surface, the die will have moved up from the letter and the impression surface will have passed on down and a recess 73, will receive said clamps and accommodate them (see Fig. 7) so that when the parts have completed said stroke, they will come to rest with the clamps in the recess and the letter will be located above the front top portion of the turret and the other impression surface of the impression roll will be in position to receive the next letter carried by the following row of clamps of the turret. The shaft carrying the die is yieldingly held down toward the impression roll to accommodate both thick and thin letters and apply the desired printing pressure thereto, while the swingable mounting of the die on the shaft permits the same to rock from the center of its length as a fulcrum to conform to letters of varying thickness in different portions.

Any suitable inking roll (not shown) can be carried by hanger 77, to ink the die previous to its arrival in printing position.

I show the hanger 77, formed with a vertical offset to support the outer end of the shaft 75, and provide space to receive and allow for the rotation of the die.

If it should be necessary to "back stamp" canceled and postmarked incoming mail, being distributed for the carriers or other purposes, an impression surface of approximately the form of die 74, might be substituted therefor, and a printing wheel of approximately the form of the impression roll 67, might be substituted therefor and provided with printing characters at the rear portions of its two concentric surfaces. Where the elements of the printing couple are thus reversed, a suitable inking roll would be arranged within the turret to co-operate with the printing characters of the rotary element 67.

It will be noted, that the separating mechanism, the turret, and the printing couple are formed and arranged to properly operate on letters of marked differences in width, inasmuch as the separating mechanism takes hold of the lower long edge portions of the letters whereon the stamps should be located, irrespective of the width of the letter, and the same remark is true of the turret clamps. Also, the printing member is timed and arranged to imprint on said long edge portion of each letter grasped by said clamps irrespective of the width of the letter or the distance the letter projects forwardly beyond said clamps. The capacity of the turret as to extreme width of letters, is limited by the distance between adjacent rows of letter clamps, while the turret is approximately unlimited as to extreme length of letters. The letter feeding portion of the machine is limited as to length of letters by the distance between the turret head 7, and the opposite side portions of the framework. The stamped ends of the letters are lined or evened up in the feed way against the rear side wall thereof while the long lower edges of the letters are also lined or evened up against the floor of said way, and the pneumatic separating device, the turret clamps, and the printing couple are accordingly arranged to handle and operate on the letters in view of this known fixed arrangement or location of these edge portions of the letters.

At each stroke of the turret a letter is moved downwardly and rearwardly from the vertical front position where it is held for inspection, and is dropped (by the cam surface or plate 18, opening the letter clamps) from the bottom or under side of the turret onto a horizontal floor comprising longitudinal spaced rails or fingers 86, suitably fixed to one or more supporting cross bars secured to the frame work sides. The letter is deposited in a horizontal position on said floor with its long edges arranged transversely thereof.

Spaced upwardly and forwardly extending fingers 87, carried by cross bar 88, are provided to direct the lower free edge of the letter rearwardly toward said horizontal floor as the letter is carried down by the turret. The letter is delivered under fingers 89, and onto said floor, when the lower turret clamps are opened by cam plate 18. These fixed suitably-supported forwardly-projecting guide fingers 89, are spaced apart, and located between the floor 86, and the bottom portion of the turret, and are preferably so arranged that the letter clamps of the turret will pass rearwardly between said fingers. The longitudinal spaced bars or rails 86, constitute a forward continuation of the letter floor or slideway extending throughout the length of the top row of letter boxes and arranged over the otherwise open tops of said boxes. This letter slideway or floor is made up of a series of separate vertically swingable gates normally arranged in horizontal position bridging the open box tops. Each box has a gate bridging the open top thereof and consisting of a horizontal transverse rock shaft 90, suitably mounted in opposite side portions of the frame work and arranged in the vertical plane of the rear side wall of the box (with respect to the direction of movement of letter propelling means along said row of boxes), and spaced parallel forwardly extending fingers 91, rigid with and raised and lowered by said shaft. The free ends of the fingers of each gate preferably extend forwardly and lap or rest down on the heels or rear ends of the fingers of the next gate to the front, and are arranged to form a continuous unbroken floor on which the letters can freely slide, except where a gate is swung up to deflect a letter from the floor into the box controlled by such gate. The gate fingers of a row of boxes preferably all project from their shafts in the same direction, but where the letter propelling devices do not move in the same direction over all of the rows of boxes, the fingers of the gates of one row will project in the opposite direction from the fingers of the next row. This is particularly true of the example illustrated by the drawings, wherein the letter boxes of the distributing case are arranged in eight parallel horizontal rows, and continuously moving means are provided for propelling the letters along the floors formed by said gates so that the letters will move longitudinally and rearwardly of the top row and from the rear end thereof down to the rear end of the second row and forwardly along the second row and from the front end thereof down to the front end of the third row and rearwardly along the third row and so on throughout the remaining rows of boxes. To propel the letters along the boxes, I provide a series of parallel letter pushers 93, arranged transversely of the letter slideways or floors and these pushers are uniformly spaced apart so as to successively sweep past a given point and move past all of the boxes of the case.

In this specific example, each pusher consists of a metal rod having its letter engaging portion corrugated vertically or formed with alternate elevated and depressed bends, loops or offsets 94, extending uniform distances above and below the longitudinal axis of the rod, thereby providing the pusher with depending portions to travel between the rails (fingers) of the letter slideways or floors and corresponding alternating portions projecting above said floors to engage the rear long edge of the letter and push the same along the floor.

These letter pushers are propelled and the spacing thereof is maintained by a pair of endless parallel opposite-side flexible connections, such as sprocket chains 95. The opposite sides of the frame work, beyond the box gates, are provided with fixed parallel horizontal pairs of upper and lower tracks or rails 96, arranged longitudinally of the rows of boxes, and wheels or rollers 97 are included in said chains and are confined between said rails to travel thereon. Each letter pusher is formed with opposite straight ends fixed to and against rotation in certain pairs of links of the two chains, and wheels 97, are mounted to rotate on said pusher ends and are confined between said pairs of links. The pushers are thus carried by said wheels and thereby maintained against wedging or binding and in their proper transverse positions. The pair of chains 95, virtually form spacing and operating connections between the several pushers.

To enable me to utilize an endless connection in which the pushers are included and by which they are actuated to successively travel past each box of the distributing case, vertical series of pairs of sprocket wheels 98, are arranged at the front and rear ends of the distributing case and are carried by horizontal transverse shafts suitably mounted in the sides of the frame work. These sprocket wheels are formed with properly spaced edge notches 99, to receive the wheels 97. The sprocket wheels are so arranged that a ply of the endless connection (pair of chains) will travel rearwardly over the letter boxes of the top row and pass down at the rear end of the row to the second row, and will travel forwardly throughout the length of the second row and then extend down at the front end thereof and to the third row and will travel rearwardly throughout the length of the third row and so on down to the bottom row of boxes over which the connection travels forwardly to the driving sprockets 100, from which the vertical return ply of the endless connection extends up at the front of the case to the sprockets arranged at the front end of the top row of boxes, and over which sprockets the connection and pushers extend to push the letters rearwardly from the floor 86, hereinbefore described.

The driving sprockets 100, are fixed on a horizontal transverse drive shaft 101, provided with any suitable driving means, such as pulley 102, to which the power for driving the entire apparatus can be applied.

The main drive shaft 101, is continuously driven in one direction during the operation of the machine, and consequently the endless connection provided with the pushers is continuously operated and the pushers are continuously passing in succession over the tops of the letter boxes and past the letter station formed by floor 86.

If so desired, one set or pair of sprocket wheels 98 can be carried by a shaft mounted in adjustable boxes 103, provided with any suitable adjusting means whereby said pair of wheels can be adjusted to maintain the endless letter-pusher-propelling connection 95 under the desired tension.

The corrugations or vertical deflections of each letter pusher sweep longitudinally and rearwardly between the bars of floor 86, and between the fingers 89 and extend vertically across the horizontal space between floor 86 and fingers 89, and thus force the letter deposited by the turret on floor 86, rearwardly therefrom and along the fingered gates.

The spacing of the letter pushers included in the endless constantly moving connection, is so timed and arranged with respect to the turret and the strokes thereof, that each letter deposited on the floor 86, by said turret will fall between letter pushers of said connection, that is behind the pusher that has just passed said floor and in front of the immediately following pusher, and so that the pushers pass through or across said floor 86, immediately behind or immediately in front of the row of letter clamps passing from front to rear at the bottom of the turret. Any suitable means are provided to guide the letters in descending from one row of boxes to the next row below and to maintain the proper flat transverse position of the letters when being thus propelled by the pushers down from the end of one row to the end of the next row between the chain carrying sprockets at the box row ends.

In this connection, I preferably arrange longitudinal horizontal spaced fixed bars or rails 105, throughout the lengths of letter passages above the box rows and spaced a distance above the floors or slideways (formed by the gate fingers 91,) to determine the vertical widths of said letter passages. These bars are suitably secured to the frame work sides.

The vertical deflections of the pushers extend up between the bars 105, and depend between the gate fingers and hence the letters pushed forward cannot ride up over the pushers but are confined thereto. At the ends of the rows of boxes passages are formed connecting the passages over the boxes, by inner and outer fixed concentric curved bars or rails 107 and 106 between which the letters are moved by the pushers. The curved outer bars 106, form downward continuations of the bars 105, of the box row above, and at their lower ends continue into alinement with the floor formed by the gate fingers, while the curved inner bars 107, form downward continuations of the floor formed by the gate fingers and at their lower ends continue into alinement with the bars 105, of the letter passage below. Light curved wire, or other suitable springs 108, can be arranged in the curved portions of the letter passages formed by bars 106 and 107, to apply light friction to the letters in passing down said curved passages to prevent the letters dropping by gravity below the pushers propelling them.

As has been heretofore explained, the letter pushers move in the same direction in alternate letter passages over the letter boxes but in an opposite direction in the letter passages over the intervening rows of letter boxes, and hence in said alternate letter passages the gate fingers all project in the same direction (in a direction opposite to the direction of travel of the pushers therein) while in the intervening passages the gate fingers project in the other direction which is opposite to the direction of travel of the pushers in said last mentioned passages.

The upper deflections or loops of the pushers are arranged to pass over the gate fingers even when elevated, and thus prevent elevated or opened gates from interfering with the continuous forward movement of the letter pushers through the case of boxes.

In the particular example illustrated gates cannot remain open for more than one pusher to pass, for each pusher approaching a previously opened gate will engage the cam arm 164, of such gate and close the same even though the set up tumblers of such pusher should cause immediate reopening of such gate.

Referring to the common point (for instance, the floor 86) at which the conveyer pushers receive the letters for distribution, it is not necessary that each letter be first discharged from the turret clamps before being taken up by a conveyor pusher, inasmuch as the movements of the turret and pushers of the conveyer are preferably so timed, that each letter carried by the turret to the floor 86, is closely followed by a conveyer pusher and if the letter does not immediately drop from the turret it will be taken from the turret clamps before engaging fingers 89, by a pusher moving rearwardly at floor 86.

If the turret is continuously operated, each letter carried around by the turret to floor 86, will be overtaken by a conveyer cross bar and taken up thereby and pushed rearwardly on said floor into the distributing case. The spacing between the conveyer pushers is greater than the spacing between the stations or stopping points of the turret or between the rows of clamps carried by the turret and yet the operation of the turret and conveyer is so timed and the relative arrangements of these parts is so fixed that no confusion or wrong deliveries should result even when the truret is rotated continuously and not with a step by step motion, as might occur should the operator keep a key depressed for an undue length of time or to purposely cause delivery of a series of letters into the same box.

The operator is stationed in front of the apparatus where he can easily see and read the address of each letter as it is presented by the turret at the front in position for inspection.

A bank of finger pieces, push buttons, or keys 109, is arranged in front of the frame work in a forwardly projecting frame 110, fixed to and projecting forwardly from the front uprights of the frame work. The keys are so arranged as to be readily visible to the operator and accessible to the operator from his position where the letters held by the turret are in view. Each letter box of the distributing case is represented by a separate key 109.

Each key or push button 109, extends upwardly from and is carried by a lateral arm 111, from a horizontal rearwardly extending rock shaft 112. These rock shafts 112, are suitably supported or mounted at their ends in the framework. There is a separate independent rock shaft for each push piece or key 109, and each rock shaft is yieldingly held by a suitable spring in normal position with its key in elevated position. The arrangement is such that the depression of a key will through the medium of lateral arm 111, carrying said key, cause the shaft 112, belonging to such key to be rocked against the tension of its spring. These keys are provided to select the boxes to which letters are to be delivered and to throw certain means into action to cause a stroke or operation of the separator and of the turret. The shafts 112, are all coupled to throw said certain means into action, so that the depression of any one of the keys will throw said means into action, and the depression of any key will cause delivery of a designated letter into the box represented by said key.

In the particular illustration, I show one hundred and twelve letter boxes, and consequently the bank of keys comprises at least one hundred and twelve keys or push pieces and their respective shafts 112, although in addition I show a finger bar 113, included therein. A number of independent yieldingly-upheld vertically-movable parallel plates or frames 114 are located in the frame 110, and are transversely arranged with respect to the rock shafts 112. These plates are formed with series of vertically-elongated alined slots 115, extending transversely therethrough for the passage of the shafts 112, and to permit vertical movement of the plates. Each shaft 112, extends through all of the plates. The plates are formed with vertical series of shoulders or teeth 116, longitudinally of said slots or openings, and the shafts 112 are formed with laterally projecting fingers or toes 117, arranged in said slots 115, and adapted to engage shoulders 116, of the plates to depress the same when the shafts are rocked by depression of keys, as will hereinafter be more fully set forth.

The plates are hung so that any plate can be depressed against the tension of its upholding spring, without causing the depression of any other plate of the series. For instance, I show the plates hung by pairs of upper and lower vertically swingable links 118, to approximately maintain the upper and lower edges of each plate horizontal during the vertical movement thereof. The upper links 118 for the plates are all mounted to swing independently on a suitable horizontal supporting rod 119, and the lower links 118, are all mounted to swing independently on another and lower horizontal supporting rod 119. These plates control means whereby the vertical shaft 22, can be thrown into operative connection with driving means for causing a single stroke or rotation of said shaft. For instance, I show the shaft 22, forming an upward continuation of a continuous rotating shaft 120, at its lower end geared to and driven by the continuously rotating main shaft 101, through the medium of gearing 121.

Any suitable clutch mechanism is provided for making and breaking the operative connection between shafts 120 and 22. For instance, I show what is commonly known as a "punch press clutch" for this purpose. This clutch comprises a continuously-rotating socket member 122, fixed to the driving shaft 120 and a male member 123, fixed to the lower end of shaft 22, and fitting concentrically within the socket member. These two members can be locked together to rotate as one and thereby operatively connect the two shafts, by a vertical locking pin or key 124, carried by and rotatably mounted in the member 123 and at its lower end having a reduced side portion or flat face 125. The lower end of said pin is exposed to contact an internal cylindrical surface of the continuously-rotating clutch member fixed to shaft 120, and said member can freely rotate on and independently of the upper clutch member so long as said flat side face 125, of the pin 124, is exposed to said cylindrical surface. Said cylindrical surface, however, is formed with a vertical rounded socket 126, into which the lower end of said pin can project to lock the two clutch members together to rotate as one body. When the pin is rotated to withdraw the reduced side 125, into member 123, the full size portion of the pin will enter the socket 126. The pin 124, is provided, at the upper end of clutch member 123, with a lateral hook-shaped controlling or operating arm 127, and with a spring 128, constantly tending to rotate the pin 124, to locking position, i. e., yieldingly holding the pin with its reduced or flat face bearing against the inner cylindrical surface of the socket clutch member so that when the inner socket 126, co-incides with the pin, the pin will be free to rotate under the tension of spring 128, to project into said socket and lock the two clutch members together.

A suitable stop or trip is provided to engage the free end of the arm 127, of the locking pin to normally hold said pin against the tension of its spring and in unlocked position, i. e., with its reduced face turned to the inner cylindrical surface of the clutch member 122.

In the particular example illustrated, this stop or trip consists of a radial toe or arm 129, carried by and rockable with rock shaft 130. This rock shaft is suitably mounted in the frame work and is arranged horizontally at adjacent ends of the plates 114, and parallel with the key rock shafts 112. Said rock shaft forms the pivot shaft of a bail consisting of universal bar 131, carried by lateral arms rigid with said shaft. The universal bar 131, and consequently the shaft 130, and the stop 129, are yieldingly held in normal position by spring 132. This spring holds the universal bar at its limit of upward movement determined by the stop pin 133.

All of the vertically movable plates 114, project over the universal bar 131, so that the depression of any one of said plates will force the universal bar 131, down and thereby rock the trip or stop shaft 130, in a direction to swing the trip or toe 129, outwardly from operative engagement with the clutch locking pin lever or arm 127, and thereby permit the clutch locking pin to rotate under the tension of its spring 128, so that said pin will project into socket 126 (as soon as said socket in the rotation of clutch member 122 arrives opposite the pin) and lock the shaft 22, to rotation with the shaft 120. The apparatus is designed to permit the shaft 22, to make one complete stroke (in this instance one complete revolution) each time the clutch is thrown in and then to automatically come to rest through the disconnection of the clutch.

For instance, whenever a key 109, is depressed, one or more plates 114, is or are thereby depressed, hence depressing the universal bar 131, and rocking shaft 130, to swing the trip or stop 129, from holding engagement with the clutch locking pin arm 127, to throw the shaft into operative connection with the driving shaft 120. The operator immediately releases the key he has thus depressed and it thereupon is returned to normal elevated position permitting the plate or plates 114, depressed thereby to return to normal elevated position. The spring 132 thereupon returns the universal bar 131, to normal elevated position and the rock shaft 130, rocks therewith and returns the stop 129, to normal position in the path of movement of the locking pin arm 127. These return movements occur before the shaft 22, has completed its single revolution, so that as the locking arm 127, is completing one revolution it comes in contact with the stop 129, and the lock pin is thereby rotated against the tension of its spring to disconnect the clutch and automatically bring the shaft 22, to rest on the completion of a single revolution.

The trip or stop 129, has a limited longitudinal movement on the shaft 130, and is connected thereto to rock therewith by a pin and slot which also limits the longitudinal movement of the trip on its shaft. A coiled spring 134 is arranged on said shaft to yieldingly hold the trip at its limit of movement in one direction. This spring acts against the pressure of the locking arm 127, thereon and hence tends to cushion the shock of the engagement between said arm and the trip when the trip causes the disconnection of the clutch. Also when the trip is swung out by its shaft 130, to release the clutch, said spring 134 causes the trip to move longitudinally on its shaft and hence not return to its position in front of arm 127, should the trip be released to return to normal position before the socket 126, reaches the locking pin and permits rotation thereof to lock the clutch members together.

Inasmuch as the key representing the last letter box, the one hundred and twelfth box in this instance, does not control box selecting mechanism as said box is always open at the top, and the pushers will deliver into said last box all letters that have passed the preceding one hundred and eleven boxes of the distributing case, the shaft of said key does not operate to depress plates 114, but only operates to depress the universal bar 131. To accomplish this result, I can mount a lever 135, loosely on the rock shaft 130, and extend the same over the universal bar and provide the free end of the lever with a crank arm and push link connection 136, with the rock shaft 112', of said key, so that depression of said key will not depress a plate 114, but will cause depression of the universal bar to throw in the clutch through the medium of said connection 136, and lever 135.

The vertically-movable finger or space bar 113, of the key board also operates mechanism to depress the universal bar 131, to throw in the clutch without depressing any of the setting-up-mechanism plates 114. Said space bar can be utilized to operate the apparatus where it is not necessary to select boxes by depressing keys and setting up combinations involved in the selective or sorting mechanism, as might be the case where it is desired to operate the turret when empty to bring a letter around to the front or inspecting station.

When a letter is presented by the turret to the eye of the operator for address reading, the operator depresses a key or finger piece corresponding to or representing the particular box of the distributing case in which the particular post office distribution "scheme" being followed requires deposit of letters so addressed. This operation of the key throws the shaft 22, into gear with its driving power, as hereinbefore described, to cause delivery of said letter to the distributing or sorting letter conveying means, among other operations. This particular key operation also sets certain means to cause deposit of this particular letter in the box represented by the key operated.

The fingered gates normally closing the letter boxes against entrance of letters thereto from the letter passages between the rows of boxes constitute means for positively causing deposit of letters into the boxes. The constantly moving letter propellers or pushers are provided with means for opening the gates to cause discharge of letters into the boxes and the gates are actuated and opened by the forward movement of the pushers. The pushers and gates are provided with devices to co-operate and positively open the gates as a result of the forward movement of the pushers, but it is necessary to open a particular box to receive a particular letter after letters in advance thereof have moved past said box, and to close said box after its letter has been deposited therein and before the following letter has reached said box. To accomplish this result, the constantly moving pushers passing successively along the letter receiving point or station and carrying the letters successively therefrom and through the distributing case, are uniformly spaced apart and each letter is received and propelled thereby between two pushers, and the pusher in advance of the letter is provided with devices to open the particular box in which said letter belongs while the pusher behind and actually propelling said letter is provided with means to close said box after the letter has been deposited therein.

Each letter propelling device or pusher is provided with means that can be set or adjusted to cause delivery of a letter into any one of the boxes of the distributing case and to pass the box opening means of all remaining boxes without operating the same. Setting up mechanism is provided, common to all of the letter propelling devices, to set or adjust said box selecting means of the devices to determine the particular boxes to be opened by the particular devices. This setting up mechanism is common to all of the finger pieces or keys that represent boxes of the distributing case having letter deflecting gates or other means to cause delivery of letters thereto. When a particular key is operated, the letter corresponding to said key is caused to be deposited between two pushers of the conveyer that propels the letters through the case of boxes, and also said setting up mechanism is operated to adjust the box selecting devices carried by the front pusher (of said two pushers) to cause said pusher to open a particular box to receive said letter, and to pass by all other boxes without disturbing the means closing the same.

In the particular example illustrated, I show each pusher formed with an extended end, arm, or shaft 137, rigid therewith and projected beyond the rear side of the case of boxes and on this shaft or arm I arrange the box selecting and opening mechanism, in this example consisting of a series of similar closely-arranged tumblers, blocks or fingers 138, independently journaled and rockable on said shaft. Each tumbler consists of a hard metal (or other suitable) block having a bearing opening between its ends to receive the shaft, and having one end beveled or rounded to form the operating end. The blocks can be swung on the shaft to and from inoperative (normal) and operative positions, and means are provided to detachably maintain each block in one of these positions. For instance, I show the shaft formed with two longitudinal grooves 139, 140, and each block internally provided with a longitudinally arranged spring-pressed detent or pin 141, having a reduced point yieldingly held against the shaft and adapted to snap into groove 139, to hold the tumbler in normal inoperative position, and under application of the necessary force to permit the tumbler to swing to operative position with the spring pin in groove 140, see Fig. 17. This spring pin is arranged to prevent movement of the tumbler otherwise than through the comparatively short swing between these two positions.

The tumblers of the series are independently rockable so that any one or more tumblers can be rocked to operative position leaving the remaining tumblers in inoperative position. The tumblers normally are parallel with each other and in the same plane, i. e., in inoperative position. The series of tumblers are held on the shaft between stops to maintain the tumblers fixed against movement longitudinally of the shaft, and the individual tumblers of each series are fixedly maintained in certain spaced relation or positions. The series of tumblers of all of the pushers are alike in numbers and lateral spacing so that corresponding tumblers of all the series will move in the same paths or vertical planes. Each series of tumblers can be made up of any suitable number of tumblers to permit the adjustment thereof necessary to attain the number of combinations or different "set ups" required by the number of boxes included in the distributing case. In the present instance, I show each series composed of eleven similar uniformly spaced tumblers, although such a large number of tumblers is not required for each set to permit the different combinations needed to operate the letter delivering devices (gates in this instance) of one hundred and twelve boxes, the number of boxes included in the distributing case of the particular example illustrated.

Each box gate is provided with means adapted to be operatively engaged by tumblers of any series when set up or adjusted in a certain way or set to a certain combination, to cause elevation of the gate and opening of the box to receive the letter immediately behind the pusher carrying the tumblers so set up or adjusted.

Various means can be provided for this purpose, although in the example illustrated, each gate shaft 90, is formed with an extension 142, or 142', extending beyond the rear side of the case of boxes and arranged below the horizontal plane of the path of movement of the pusher shafts 137, over the box to which said gate belongs.

The shaft extensions 142, 142' are parallel with the pusher shafts 137, and each shaft extension is provided with laterally extending means, such as a crank or the like, rigid therewith and adapted to be swung by the tumblers of the pushers to swing the gate shaft to raise the gate fingers. Such gate shaft swinging means in its most simple form consists of a vertically swingable narrow plate, cam lever, or crank arm 143, (see lower portion of Fig. 1) arranged parallel with the direction of movement of the pushers and held in the path of movement of corresponding tumblers of each series when in operative position, to be engaged and swung thereby to swing its gate to elevated position.

In the present instance, where eleven tumblers form a series, and the corresponding tumblers of all series are alined or move in the same vertical planes, eleven box gates can be equipped with operating devices comprising single swinging levers 143, by arranging these eleven levers out of alinement longitudinally of the row and each in the path of travel of a particular tumbler so that each lever is located or spaced a greater distance laterally from the vertical plane of the row of boxes, than the lever of the preceding gate, and the spacing between adjacent levers is approximately equal to the thickness of a tumbler.

These levers are so arranged that the tumblers will pass without operatively engaging them when the tumblers are in normal inoperative position, but when any tumbler is in operative position, it can pass to one side of ten of said levers but its rounded engaging end will ride on the eleventh lever and swing the same vertically and thereby swing the gate controlled thereby to open position. Each tumbler of any series when in operative position will engage and operatively swing one of said levers but not the others.

Where each series of tumblers consists of a number but one less than the number of boxes in the distributing case, each box gate (or other letter depositing device) needs but one opening device, such as lever 143, and the box selection can be provided for by different lateral spacing of the levers so that each lever will fall in the path of movement of but one tumbler. However, to avoid such a comparatively wide lateral space and such long shafts 137, and extensions 142, 142' as would be thus required for a case of any considerable number of boxes, I have utilized the single levers 143, for only eleven boxes, in this instance, constituting the last or bottom row of the case, and have arranged gate opening devices for the preceding box gates requiring sets of two or more tumblers in operative position for actuating the same.

Inasmuch as the letter pushers are moving forwardly and hence (in this particular example) the operating ends of the tumblers are directed upwardly, when moving over the boxes of the bottom row, it is necessary to arrange the levers 143, above the path of the series of tumblers and above the gate shafts controlled by said levers. I hence provide brackets 144, fixed to the frame work and carrying horizontal rock shafts 145, to which the levers are fixed and from which they extend downwardly and forwardly. Each rock shaft 145, is rigid with a depending arm 146, having a tooth and socket operative engagement with the upper end of an arm 147, rigid with and extending up from a gate shaft extension 142, whereby each lever 143, is operatively connected with its gate shaft. When the set tumbler of a passing pusher engages a lever 143, and swings the same up, the shaft 145, is thereby rocked to swing its arm 146, forwardly hence swinging arm 147, forwardly and rocking the gate shaft to raise the gate fingers to receive the letter being pushed forward by the pusher immediately following the one that opened the gate.

In the particular example, I show the gate swinging means of any suitable number of boxes beginning with the first box and extending through one or more rows each arranged to require three properly set tumblers of a set to cause operation of said means, and the gate swinging means of the following boxes up to those of the gates having single levers 143, each arranged to require two properly set tumblers of a set to cause opening of a gate. Take for instance, the gate swinging means of the gates of the first (top) row of boxes that require three properly set tumblers to operate the same, and it will be noted that each gate shaft extension 142', has a lever or crank 148, fixed thereto and extending rearwardly and approximately horizontally therefrom and formed by a comparatively wide plate or casing at its free end having a transversely arranged ball chamber or housing 149, closed at its ends and containing a row of balls 150. Three vertically-swingable spaced parallel cams, bearing-surface plates, or levers 151, are loosely mounted on the shaft extension 142', to separately rock freely thereon, and are arranged over and confined to the plate 148, and at their free ends are provided with flat blades or flanges 152, depending through slots in said ball housing 149, and normally resting just over the row of balls 150, therein. The balls are of such diameter with respect to the length of the housing and the combined widths of the blades 152, as to allow sufficient play of the balls longitudinally of said row to permit all but one of the cam or bearing surface levers 151, to freely swing down to their limits with their blades 152, passing down between and separating balls of said row without depressing the plate 148, but so that if all three of said levers are depressed said balls will not separate sufficiently to permit the blades 152, to pass between them, but will cause the said levers to swing the crank 148 down to rock the gate shaft and open the gate. The length of the ball housing is sufficient to allow the balls to freely roll longitudinally of the housing a limited distance and thereby separate as the blades of any one or two of the cam levers are forced down between the balls, but the free space for the balls is not equal to the combined widths of the three lever blades, hence when all three levers are simultaneously depressed, the free ends of the levers are virtually locked against downward swing by the row of balls so that downward pressure against the three levers will swing the crank or plate 148 down and thereby open the fingered gate thereof.

The blade 152', of the center cam lever is preferably formed by an elongated plate formed to yield or give laterally at its free end independently of its lever, to accommodate the positioning and spacing of the balls to prevent wedging of the lever between the balls. The opposite ends or heels of the levers 151 preferably have springs 153, applied thereto to yieldingly hold the levers in and to return them to their normal elevated positions and against a stop edge or ledge 154.

Instead of employing a row of loose balls for locking the cam levers to the crank arms, a row of independently pivoted arrow-head-shaped pieces 150ª, might be employed as shown in Fig. 19ª. The operation of this modification will be obvious from the preceding description of the purpose and operation of the structure of Fig. 19.

The gate operating devices that embody only two cam levers 151, are constructed the same as those having three cam levers except for the omission of the third cam lever having laterally flexible blade 152', and the arrangement of the rows of balls and their housing to permit free swing of only one cam lever of each set, so that when both cam levers of a set are simultaneously swung by two set tumblers of a pusher the crank arm carrying such levers will be rocked to open its gate. The series of gate operating devices having sets of three cam levers, are so spaced laterally and arranged that the cam levers of no one set all fall in longitudinal alinement with the cam levers of any other set of three so that three tumblers of the tumbler set of any pusher can be turned to operative position to simultaneously engage and depress the three cam levers of one of said devices and thereby cause opening of the gate controlled thereby, and yet said three set up tumblers will not engage all three levers of any other device. One or even two of said set up tumblers may engage and freely depress one or even two cam levers of other devices without rocking said devices. Also a set of tumblers having only one tumbler set up to engage one of the single levers 143, may pass the devices comprising three cam levers and the devices having two cam levers and freely swing single levers of each but without thereby swinging the crank arms carrying said cam levers and without disturbing the letter box gates thereof.

Also a set of tumblers having only two tumblers set up to simultaneously engage and depress the two cam levers of a gate opening device embodying only two cam levers, to operate the same to open its box gate, will move past the gate opening devices embodying three cam levers without operating the same although possibly engaging and freely swinging one or even two cam levers of one or more of said devices.

Where box gates are arranged over boxes of the rows along which the letter pushers move forwardly so that the operating or engaging ends of the pushers project upwardly, the crank arms or plates carrying the cam levers to be engaged and swung by said tumblers, are fixed to rock shafts 145, carried by brackets 144, as hereinbefore described, in connection with the gates of the last (bottom) row of letter boxes, and these rock shafts 145, are operatively connected to the gate shaft extensions 142, by arms 146 and 147, as will be readily understood from the previous description.

Each gate opening crank or lever 148, and 143, is provided with or actuates means to restore the set up tumblers to normal or inoperative position, immediately after said tumblers have actuated and passed a device 148, or 143, to open the gate controlled thereby, but said means are normally arranged out of the path of the tumblers and are only thrown into operative position in the path of said tumblers when the box gate connected therewith is swung to open position.

For instance, in the present example, I show each crank arm 148, and 143, provided with a lateral arm 155, projecting radially from the axis of its said crank arm and rigid therewith to swing vertically with said crank arm. Each arm 155, has a horizontal rod or sweep 156, rigid with and projecting inwardly from its free end, and arranged parallel with and at a distance in rear (with respect to the direction of travel of the pushers) of the particular gate shaft operated by said crank arm. When the crank arms 148, 143, are in normal positions with the box gates closed, said sweep rods 156, are arranged above or below the horizontal paths in which the sets of tumblers carried by the pushers move. When a crank (148 or 143) is swung by a proper tumbler "set up" to elevate its box gate, the arm 155 of said crank swings therewith and brings its sweep rod 156, into the path of the ends of the set up tumblers before they reach the next gate shaft and swing said set up tumblers back to normal position. The tumbler "set up" of each pusher is thus restored to normal position immediately after said "set up" has performed its work by causing deposit of the letter represented thereby in the particular box for which it was predestined.

The spaces between the letter pushers, in effect, form letter receiving compartments, each receiving one letter, and the tumblers of the front pusher of a compartment (which is the rear pusher of the next compartment in advance) actuate the particular gate operating means to open the box gate to which the letter is predestined by the depression of a particular key, while the rear pusher (which is the front pusher of the next compartment to the rear) through suitable means serves to close the gate of the box into which a letter from said compartment has just been delivered. For instance, the means for closing the box gate in the present example, is more or less involved with means for holding the gate open when elevated to that position and holding the gate depressed to its limit when moved to closed position.

For instance, I show each box gate shaft provided with a depending plate or finger 157, rigid therewith and having a spring 158, connected thereto and constantly exerting its tension thereon in a direction to swing the box gate to closed position and yieldingly maintain the same in closed position. The lower end of this finger 157, is beveled at the rear side thereof downwardly and forwardly to a rearwardly facing notch or shoulder 158'. A rigid or fixed stop pin, 159, is arranged in front of said finger to limit the forward swing thereof and consequently limit the opening swing of the box gate.

A vertically-swingable horizontally-arranged toothed dog or latch 160, is arranged below said finger and its free end is yieldingly upheld toward the free end of said finger by a spring 161. The upper edge of the free end of said latch is beveled upwardly and rearwardly to a rearwardly facing tooth or shoulder 162. Below said tooth, the latch is provided with a laterally or outwardly projecting pin or projection 163.

An elongated vertically-swingable horizontally-disposed bowed or curved gate closing arm 164, extends rearwardly from the box gate shaft and is loosely mounted thereon close to the rear side wall of the box case and is formed rigid with a depending projection 165, arranged beside the shaft finger 157, and at the outer side of the free end of latch 160. The lower extremity of said projection 165, is formed with converging inclined or beveled edges to bear against the pin 163 of the latch, while said projection is provided with a lateral pin 166, traversing and engaging the front edge of the gate shaft finger 157.

The arrangement is such that when the gate is closed and the parts are in normal positions, the curved rearwardly extending arm 164, will be in inoperative position depressed below the path in which the pushers and their parts travel, and will be thus held by the pin 163, of the latch bearing upwardly against rear beveled or inclined edge of the lower end of the depending projection 165, which cam action tends to force said projection forwardly and arm 164 downwardly and to press the pin 166, of projection 165, forwardly against the front edge of finger 157, of the gate shaft and thereby aid in holding the gate tightly closed.

When the tumbler "set up" of a pusher, in advance of a letter belonging in a certain box, swings the crank lever of the gate of that box and thereby opens said gate, the curved arm 164, belonging to said gate is swung up just behind said tumblers by the engagement of the gate shaft finger 157, with the pin 166, of the projection 165, of said arm, thereby depressing the latch 160, until the point of projection 165 has slipped rearwardly past latch pin 163, whereupon the latch springs up and pin 163, engages the front beveled edge of projection 165, to hold the arm 164, in elevated operative position. The elevation of the gate causes the gate shaft finger 157, to swing rearwardly to engage stop pin 159, to limit the upward swing of the gate and carries the tooth 158', of said finger forwardly over the free end of the latch to drop in front of tooth 162, thereof to limit upward swing of the latch and to lock the gate in its elevated position. When in elevated position, the curved arm 164, extends into the path of movement of a collar 167, on (or other portion of) the pusher between the tumblers thereof and the adjacent propelling chain, and is located at the rear side of the box case in line with the elevated gate. This arm 164, is elevated just after the pusher immediately in front of the letter has passed and before the letter reaches said box gate. Just after the pusher propelling the letter has passed the elevated points of the gate, the portion 167 of said pusher rides on the curved arm 164, and forces the same down. This downward swing of said arm carries its projection 165, forwardly so that its beveled lower end depresses the latch through the medium of pin 163, thereby depressing the tooth 162, of the latch to a point below the tooth 158', of the gate shaft finger 157, and thus releasing the gate shaft so that the pin 166, of the arm projection 165, can swing said finger forwardly and force the gate down to closed position aided by its spring 158. The pin 163, of the latch 160, bearing up against the beveled lower end of the projection 165, insures the complete return of arm 164, to depressed inoperative position.

Mechanism controlled by the key levers is provided to operate on the pusher tumblers to adjust or move the same in arranging the tumbler "set ups" whereby the box gates are opened. Various means and arrangements can be provided for this purpose, although in the present instance, I show a frame, case or box open at the top, bottom and ends and consisting of vertical side plates 168, fixed together by rigid horizontal cross bars, and secured in the frame work of the apparatus at the rear side of the upper front corner thereof and behind the shaft 22, and just under the path of movement of the series of tumblers of the pushers that are passing the letter receiving position formed by floor 86, and in this box I mount a series of vertically-movable tumbler-adjusting or setting-up elements, each embodying an upwardly projected curved end or hook-bill 169, adapted to be brought into operative engagement with a particular tumbler 138, to swing the same to set up or operative position.

In this example, each pusher carries a set of eleven tumblers, and each tumbler is alined with the corresponding tumblers of all other sets so that in passing over the tumbler setting hooks, fingers or detents 169, the corresponding tumblers of all the sets move in the same vertical plane and hence all the tumblers of all the sets move in the same parallel eleven planes and in the same horizontal plane. Hence, I provide eleven tumbler setting-up elements each embodying a hook 169, and these eleven hooks are arranged in said eleven vertical planes and normally just below said one horizontal plane. The tumblers are arranged in their normal inoperative horizontal positions as they move forwardly over said elements and the elements are provided with controlling means whereby one or more hooks 169, can be elevated into the path of movement of one or more tumblers so as to engage the noses or operating ends of said tumblers and swing said tumblers to set up position with their said operating ends projecting downwardly and forwardly. In this instance, the setting up elements are rockable vertically on and are carried by a fixed common transverse shaft 170, carried by the box sides 168, and each element consists of two members, to wit, the horizontally and rearwardly extending finger 169, having its rear free end curved or deflected upwardly to form the tumbler engaging hook bill, and at its front portion loosely mounted on shaft 170, and a body or main portion, operating plate or member 171, loosely mounted on said shaft beside finger 169, and having a forwardly extending arm provided with stop 172, projecting over the free end of finger 169, to limit the upward swing thereof with respect to said main member 171, but to permit downward swing of the finger independently of said main member. The finger is yieldingly held up against said stop 172, to normally swing with the main member by spring 173, attached to the main member and the finger. The eleven setting up elements are all similar in construction, and said elements are normally held locked in depressed inoperative positions by a series of pawls or detents 174, (one for each element). The pawls are independently swingable vertically on a common fixed shaft 175, and are yieldingly held upwardly by springs 176. At its free end each pawl is formed with an upwardly projecting bevelled tooth held bearing upwardly against the lower edge of the depending portion of the main member of its setting up element and normally engaged in a notch 177, of said member to detachably hold the same and its finger in inoperative position. In advance of said notch 177, the edge of each member 171, is formed with an elongated notch or recess 178.

Each member 171 is formed with rearward projections or toes 179, and 180, and an intervening recess or socket 181, to co-operate with a locking and controlling plate common to all of said elements. This plate or locking member 182, is carried by a transverse horizontal shaft 183, carried by the box sides 168. The lower edge of the plate 182, is loosely mounted to swing freely on said shaft and the top edge 184, is usually curved downwardly and forwardly and arranged in front and transversely of all the setting up elements to co-operate with the projections 179, and recesses 181, thereof. At a distance below edge 184, said plate is provided with a blade, shoulder or edge 185, arranged below the projections 180, of the elements 171 to co-operate therewith as hereinafter set forth.

The rockable locking plate 182, is controlled and actuated by an upright rock arm 186, carried by shaft 183, and at its upper end provided with anti-friction roll 187, held to the peripheral edge of a horizontal cam 188, fixed on and rotating with the shaft 22, by a spring 189, applied to the lower end of said arm. The cam controls the lateral position of the arm 186, and thereby controls the position of the locking plate through the medium of a cushioning or yielding spring connection 190, between the arm and plate requiring the plate to swing with the arm but permitting a slight independent yielding between said parts. The cam 188, is formed with a concentric peripheral edge beginning and ending at two adjacent edge depressions or notches 191, and 192, one being deeper than the other, for the purpose hereinafter explained.

The setting up devices are primarily controlled by the finger keys through the medium of the eleven vertically movable frames or plates 114, hereinbefore described, and operative connections between the plates and setting up devices.

Each plate 114, represents and operates a certain setting up device and no other.

Any suitable operative connections can be established between the respective plates 114, and the corresponding setting up devices, although in the present instance, I show eleven horizontal independent rock shafts 193, each having a lateral crank arm 193', operatively engaging its respective plate 114, and each having a crank and pull rod connection 194, to a corresponding upper rock shaft of a series of eleven independent rock shafts 195. These eleven upper rock shafts 195, have crank and pull rod connections 196, with the forward portions of the setting up devices, respectively, so that each plate 114, is independently connected to operate one of the setting up devices.

It will be noted that whenever a plate 114, is depressed, the crank arm 193', engaging said plate will be swung down to rock its shaft 193, and consequently rock the corresponding shaft 195, in a direction to swing a setting up device to elevate its hooked end 169, through the medium of pull connection 196.

When a key 109, is depressed that corresponds to a box whose gate opening means requires a set up of three tumblers to actuate the same, the shaft 112 of said key will depress three plates 114, (through the medium of three toes 117. on said shaft and corresponding shoulders 116, in said plates) and the depression of said three plates will elevate the hooked ends 169, of a certain three setting up elements.

When the key 109, depressed represents a box whose gate opening means requires a certain set up of two tumblers to be actuated thereby, then the rocking movement of the shaft 112 of said key will depress but a certain two of said plates 114, and consequently elevate a certain two setting up elements, as said shaft will be only provided with two toes 117.

When the key 109, depressed represents a box whose gate opening means requires only one tumbler for actuation thereby, then the shaft of said key will depress only a single plate 114, and thereby elevate only one setting up element.

When the shaft 22, is at rest and parts actuated thereby are in normal position, the roll 187, is in notch or depression 191, of cam 188, and the locking plate is in normal position with its edges 184, and 185, removed from the projections 179, and 180, so that any one or more of the setting up elements can be elevated from their normal depressed positions.

When the operator inspects the address of the letter held by the turret at the inspection station, he then depresses the key 109, corresponding to the box wherein a letter so addressed should be deposited, and the depression of this key immediately, through the medium of the connections described, swings one or more setting up elements a sufficient distance to clear the detents 174, from the locking notches 177, thereof, and bring the projections 179, of the element or elements thus partially elevated into operative position with respect to the edge 184, of the locking plate 182. see dotted lines Fig. 24. The depression of said key also withdraws the trip 129, from position holding the clutch disconnected. As soon as the clutch pin takes hold and locks the shaft 22, to its driving power to perform an operative stroke (one complete revolution) said shaft begins to rotate with the cam 188, in a direction to move the roll 187, from depression 191, and onto the elevated concentric peripheral portion of the cam, see Fig. 25. The arm 186, is thereby rocked to rock the plate 182, and throw its edge 184, downwardly into engagement with the projections 179, of the setting up elements partially elevated by the depression of the key. The forwardly moving edge 184, engages the projections 179, of the partially elevated elements and presses downwardly thereon so as to positively swing said elements to elevate the hooked ends 169 thereof to operative tumbler tilting position. In making this forward and downward movement, the edge 184, passes under the projections 179, of the elements remaining in inoperative position, and into the recesses 181, of said elements, and thereby locks the last mentioned elements in depressed position and the first mentioned elements in elevated position.

The edge 184, holds the elements thus rigidly locked in their respective positions, during the movement of the cam after roll 187 has been forced out from depression 191, and until said roll drops into depression 192, in other words, throughout almost the entire stroke or revolution of the cam. These elevated setting up elements are thus positively locked in set up position just before the tumblers of the front pusher of the letter receiving and propelling compartment into which the turret drops the said inspected letter, pass into operative engagement with said raised elements. The hooked ends of said raised elements catch over the noses of one or more tumblers and swing them downwardly under the pull of the pusher propelling chains and the set up tumblers then pass on over said elements by pressing the hooked fingers out of the way against the tension of their springs 173. When said set of tumblers has passed on, the hooked fingers are snapped back against stops 172, by springs 173.

Before the rear pusher of said compartment into which said letter has just been deposited, reaches the set up elements, the shaft 22 has completed its stroke or single revolution and comes to rest.

Just before the shaft completes its stroke, the roll 187, drops into the deep recess 192, see Fig. 26, in the cam 188, thereby causing the locking plate to rock upwardly to carry its edge 184 from locking engagement with the setting up elements, and to move its edge 185, upwardly into engagement with the under edges of the projections 180, of the elevated elements for the purpose of depressing said elements to inoperative position and until the detents 174, snap into the notches 177, thereof. When the locking plate edge 185 has thus restored the setting up elements all to depressed inoperative position, the cam 188, completes its rotation and comes to rest with roll 187, in the shallower recess 191. In entering recess 191, the roll 187, is slightly forced outwardly to swing plate 182, back to normal position with the edge 185, depressed to permit the preliminary finger-operated upward-swing of one or more setting up elements, see Fig. 24.

The locking plate or member 182, positively locks all of the setting up elements against movement as soon as it has been swung to locking position and thus maintains said elements fixed approximately until the shaft 22, has completed its stroke and hence prevents disarrangement of the setting up elements by premature depression of a second key during the stroke of the shaft 22, initiated by the first pressed key. The member 182, not only positively forces the preliminarily moved setting up elements to operative setting up position and then positively locks all of the elements against further movement, but also positively lines up all of said elements at normal inoperative position and thereby positively returns the set up elements just before each stroke of the machine is completed. The depression of one or more plates 114, throws up the corresponding setting up device or devices, before the shaft 22, is thrown into gear with its drive shaft, and this result is usually attained by so arranging the limit of upward movement of the universal bar 131, that the plates 114, will swing the crank arms 193', to raise the setting up devices before any one of said plates has moved down far enough to operatively depress the universal bar to throw in the clutch.

I herein employ the term "letters" in a broad or generic sense to include any and all kinds of mail matter and other articles or pieces which the apparatus is adapted to handle, or for the handling of which it can be adapted or utilized.

For the sake of clearness I have with great particularity described the details of the various groups of mechanisms employed in the example of my invention that I have selected for illustration, but I do not thereby intend or wish to so limit my invention. While I wish to lay claim to all novel details of the various groups of mechanisms, yet I particularly lay claim to all the broad novel arrangements, features and combinations of my invention not limited to any particular construction.

It is evident that various modifications, variations, and departures might be resorted to, that elements and groups of elements might be omitted and that features might be added, without departing from the spirit and scope of my invention, and hence I do not wish to limit myself to the exact disclosure hereof, but consider myself entitled to all equivalents, adaptations, modifications, variations, and departures falling within the spirit and scope of the invention as defined by the following claims.

Desiring to protect my invention in the broadest manner legally possible, what I claim is:—

1. In combination, in mail distributing apparatus, a distributing case comprising rows of boxes and having a letter passage from row to row and throughout each row, an endless letter conveyer common to all of said boxes for moving letters throughout said passage and into delivering relation with every box of every row, normally-inactive letter moving mechanism on each stroke adapted to deliver a single letter to said conveyer and then come to rest, and devices, whereby said mechanism is caused to move on a letter moving stroke, and whereby the box to which said letter will be delivered by the conveyer is predetermined.

2. In mail distributing apparatus, in combination, a distributing case wherein the letter boxes are arranged in superimposed horizontal rows and wherein a letter passage is provided from a letter receiving station to and longitudinally of said rows and from the end of one row to the adjacent end of the succeeding row, an endless letter conveyer arranged throughout said passage so that all portions of the conveyer successively pass said station and move therefrom successively into letter delivering relation with respect to each row and every box thereof.

3. In mail distributing apparatus, in combination, a distributing case comprising several adjacent rows of letter boxes and having a letter passage continuous throughout the rows and from row to row, and a letter conveyer comprising an endless series of letter moving elements successively moving into operative letter delivering relation with respect to each box of all the rows and arranged to move letters throughout the length of said passage.

4. In a mail distributing apparatus, in combination, a distributing case comprising a series of rows of letter boxes, each box having a letter ingress opening, an endless letter conveyer arranged in said case and common to all of said rows of boxes, a single letter receiving station, and means to successively deliver letters at said station, said letter conveyer continuously moving in letter receiving relation with respect to said one station and therefrom into letter delivering relation successively with respect to the ingress openings of the boxes of every row and from row to row throughout the series of rows in said case.

5. In a mail distributing apparatus, in combination, a distributing case comprising series of rows of letter boxes each having a letter ingress opening, an endless letter conveyer arranged in said case along all of said rows thereof, said conveyer comprising an endless succession of letter compartments movable successively into letter receiving relation with respect to a single common letter receiving station, and movable therefrom through said case and successively into letter delivering relation with respect to the letter ingress openings of all the boxes in said case, said conveyer arranged to simultaneously propel a plurality of letters, devices for delivering letters therefrom without regard to the order in which said letters were delivered to said conveyer, and means to successively deliver letters at said station.

6. Mail distributing apparatus embodying a distributing case comprising a series of rows of letter boxes with a letter passage extending through said case from the first box of the first row to the last box of the last row thereof and extending throughout the length of each row and from row to row, said boxes having letter ingress openings to said letter passage.

7. Mail distributing apparatus embodying a distributing case made up of series of superimposed parallel horizontal rows of letter boxes having top ingress openings and means for causing the delivery of letters into said boxes, a letter passage being provided longitudinally over all of said rows and from row to row, in combination with letter moving means arranged to move letters through said passage from the first box of the first row and throughout each row to the last box of the last row.

8. Mail distributing apparatus embodying a distributing case comprising series of parallel rows of letter boxes having ingress openings and a letter passage extending throughout the length of said case and along said openings of all the boxes, in combination with continuously moving letter propelling means movable along said openings of all the boxes, said means moving in the same direction along alternate rows of boxes and in the opposite direction along the intervening rows of boxes.

9. In combination, in mail distributing apparatus, a distributing case comprising rows of boxes, an endless letter conveyer common to all of said boxes and comprising a succession of letter pushers arranged to simultaneously propel a plurality of letters from row to row and into delivering relation with every box of every row, normally inactive letter moving mechanism on each stroke adapted to deliver a single letter to said conveyer and then come to rest, and manually controlled devices, whereby said mechanism is caused to move on a letter moving stroke, and whereby the box to which said letter will be delivered by the conveyer is predetermined.

10. In mail distributing apparatus, in combination, a distributing case comprising several adjacent rows of letter boxes, and a letter conveyer comprising an endless series of letter moving elements successively moving into operative letter delivering relation with respect to each box of all the rows, each box having means for causing discharge of letters thereinto from said elements, each element carrying mechanism for actuating said means of any box.

11. In distributing apparatus, in combination, a distributing case comprising a series of boxes, each box having a letter ingress opening and a movable gate, an endless letter conveyer arranged in said case and common to all of said boxes and having series of devices to operate said gates, a letter receiving station, and means to successively deliver letters at said station, said letter conveyer moving in letter receiving relation with respect to said station and therefrom into letter delivering relation successively with respect to the ingress openings of the boxes of said case.

12. In mail distributing apparatus, in combination, a distributing case comprising series of rows of letter boxes each having a letter ingress opening, an endless letter conveyer arranged in said case along all of said rows thereof, said conveyer comprising an endless succession of letter compartments movable successively into letter receiving relation with respect to a common letter receiving station, and movable therefrom through said case and successively into letter delivering relation with respect to the letter ingress openings of all the boxes in said case, each compartment having devices to cause delivery of a letter therefrom into any box, means corresponding to said boxes, respectively, to co-operate with said devices in causing said letter deliveries, and means to successively deliver letters at said station.

13. Mail distributing apparatus embodying a distributing case comprising a series of rows of letter boxes with a letter slideway extending through said case from the first box of the first row to the last box of the last row thereof and extending throughout the length of each row and between the ends of adjacent rows, said boxes having letter ingress openings to said letter passage, and means to push letters along said slideway throughout the lengths of the rows and from row to row and to cause discharge of letters into any box.

14. Distributing apparatus embodying a distributing case made up of series of rows of boxes having ingress openings and means for causing the delivery of units to be distributed into said boxes, a passage being provided longitudinally of said rows and from row to row, in combination with unit moving means arranged to move units through said passage from the first box of the first row and throughout each row to the last box of the last row, and having uniformly spaced series of similar devices to actuate said first mentioned means.

15. Mail distributing apparatus embodying a distributing case comprising series of rows of boxes having ingress openings and a passage extending throughout the length of said case and along said openings of all the boxes, in combination with propelling means consisting of an endless succession of pushers movable along said openings of all the boxes, said pushers moving in the same direction along alternate rows of boxes and in the opposite direction along the intervening rows of boxes, and controlling the discharge of letters into said boxes.

16. Distributing apparatus comprising means for successively taking letters from a common source and discharging the same at a common delivery station, series of letter depositories, series of devices corresponding to said depositories, mechanism for causing said means to perform an operative letter moving stroke on the operation of any one of said devices, continuous-moving letter conveying means common to said delivery station and to all of said depositories, and moving in letter receiving relation with respect to said station and in letter delivering relation with respect to all of said depositories, said letter conveying means arranged to simultaneously propel a plurality of letters and to deliver any number thereof simultaneously to predetermined depositories without regard to the order in which the letters were delivered to said means, and mechanism controlled by said devices for predetermining the letter depositories into which the letters will be delivered from said letter conveying means, and for causing delivery of letters from said means last mentioned, said mechanism comprising selective means carried by said letter conveying means.

17. Distributing apparatus comprising several non-alined rows of closely-arranged discharge stations; a series of carriers for the units to be distributed to said discharge stations; means for causing said carriers to travel in a circuit for discharging units at any one of said stations; a series of selective devices moving in unison with said carriers, respectively, for predetermining the station at which each carrier will discharge the unit transported thereby; discharge means corresponding to said stations, respectively; means for delivering units to be distributed to the respective carriers; and controlling mechanism for said selective devices.

18. In distributing apparatus, in combination, an endless conveyer for propelling units to be distributed from a unit receiving station to a plurality of unit delivery stations, a plurality of selective means movable in a circuit, for causing delivery of units therefrom at predetermined delivery stations, gates arranged at said delivery stations and normally inoperative with respect to said conveyer and each arranged to be operated by the forward movement of any one of said selective means to cause delivery of a unit at any one of said delivery stations, and keyboard controlled setting up mechanism controlling said selective means to cause delivery of the units at predetermined delivery stations.

19. In mail distributing apparatus, in combination, an endless conveyer provided with a series of individual letter pushers, operating means for said conveyer to bring said pushers successively to the letter receiving position, means for delivering letters to said pushers, series of means arranged along said conveyer for delivering the letters from the pushers thereof, said series of means being normally inoperative for removing letters, and devices carried by said pushers whereby the means of said series are moved to cause delivery of letters from said pushers and whereby the delivery point of each letter is predetermined.

20. In mail distributing apparatus, in combination, series of devices for delivering letters at predetermined points of delivery, said devices being normally out of letter delivering position, a letter conveyer movable along said devices and carrying series of means for operating said devices whereby any one of said devices can be moved to cause delivery of a letter from said conveyer and at a predetermined point, means for successively delivering letters to said conveyer, and sorting mechanism whereby any means of said series can be set to cause delivery of each letter at a predetermined point.

21. Unit distributing apparatus characterized by several non-alined rows of boxes, a supporting and guiding slideway for units to be distributed to said boxes, a series of spaced traveling devices for simultaneously propelling a plurality of units in succession along said slideway and for delivering the same to said boxes without regard to the order in which said units were received on said slideway, normally-inactive means for delivering units to said devices, respectively, and controlled selective mechanism predetermining the box to which each unit will be delivered from said slideway.

22. In a mail distributing apparatus, in combination, an endless continuously moving letter conveyer provided with an endless series of letter pushers, operating connections for continuously propelling the same, means for delivering letters successively from a common point into the path of movement of said constantly traveling conveyer, series of letter receptacles, a slideway along said receptacle and on which said pushers propel the letters series of devices corresponding to said receptacles and adapted to cause delivery of any letter from the path of movement of said constantly traveling conveyer to a predetermined receptacle, series of selective devices carried by said conveyer and adapted to positively actuate any one of said devices corresponding to said receptacles to cause delivery of a particular letter to a predetermined receptacle, and series of manually operated elements, corresponding to said receptacles respectively, and adapted to predetermine the receptacle to which a letter is delivered by causing the setting of a selective device.

23. In a mail distributing apparatus, in combination, a series of letter movers constantly traveling in an endless path, means for constantly and successively propelling said movers to the letter receiving position and therefrom successively past series of letter discharging devices, each mover having a movable selective device, means for moving said selective devices to various positions during the constant travel of the movers to predetermine the delivery point of each letter from its mover, series of letter discharging devices arranged along said path and mechanically actuated by said selective devices during the constant travel of said movers to cause discharge of the letters from the movers at predetermined points, a supporting slideway along which the letters are pushed by said movers, and manually controlled means for setting said selective devices, said selective devices operatively moving said discharging devices to operate the same positively by the forward movement of said letter movers.

24. In combination, in mail distributing apparatus, a row of letter receptacles, a continuously traveling letter conveyer along which said receptacles are arranged, said conveyer comprising a series of letter compartments, means to deliver letters to said compartments, a series of letter discharge means corresponding to said receptacles, respectively, and adapted to deliver letters from said compartments into said receptacles, each letter discharge means being normally inactive with respect to the letters in said compartments and adapted to deliver letters from any compartment to a particular receptacle when said compartment reaches letter delivery position with respect to said receptacle, said conveyer provided with series of selective devices corresponding to said compartments, respectively, each selective device capable of being set to operate any one of said discharge means to cause discharge of the letter from the compartment represented by said selective device into the receptacle represented by said discharge means, and series of manually controlled key levers provided with operative connections whereby each key lever can cause the setting of any selective device to predetermine the delivery points of the letters delivered to said conveyer.

25. In mail distributing apparatus, a seris of receptacles, a series of normally-inoperative letter discharging devices corresponding to said receptacles and each provided with a letter deflecting gate or switch, respectively, each device being arranged to discharge letters to a certain receptacle and having an operating portion differently arranged from the operating portions of the remaining devices, a letter conveyer adapted to carry letters along said series of discharging devices, series of independently adjustable selective devices carried by said conveyer and each capable of being adjusted to operatively engage the operating portion of any one of said letter discharging devices and to operatively avoid the operating portions of the remaining devices, means to successively return all of said selective devices to normal position, and manually controlled mechanisms for setting said selective devices.

26. In combination, in mail distributing apparatus, a series of letter receptacles, a letter conveyer movable along said series of receptacles and provided with a series of letter propellers, a series of normally-inactive letter discharging gates adapted to deliver the letters from said propellers to said receptacles, each gate delivering to a certain receptacle, and provided with an operating portion whereby the discharging gate can be brought to operative position to cause discharge of a letter from a propeller and into its receptacle, the operating portions of the several gates being arranged out of line with each other, a series of sets of selective elements carried by said conveyer and corresponding to said propellers, respectively, and controlled means whereby said selective elements can be successively adjusted to positions to operate certain letter discharge gates and thereby predetermine the particular receptacles to which the letters will be delivered.

27. In combination, in mail distributing apparatus, series of receptacles, series of manually controlled key levers, corresponding thereto, a letter conveyer having a series of letter propellers, series of normally-inoperative means corresponding to said receptacles and adapted to deliver letters from said propellers to said receptacles, each propeller provided with adjustable selective elements selecting and actuating the particular means to cause discharge of the letter from the propeller thereof and delivery into a particular receptacle, letter moving means for successively delivering letters to said propellers, and mechanisms controlled by said key levers whereby the operative movement of a key lever causes the delivery of a letter to a propeller of the conveyer and the adjustment of the selective elements of the preceding propeller to predetermine the receptacle to which said letter will be delivered.

28. In combination, in distributing apparatus, a conveyer for the units to be distributed, said conveyer provided with a series of adjustable selective elements, means cooperating with said elements in determining the stations at which units will be delivered from said conveyer, setting up mechanism common to all of said elements and embodying several fingers for adjusting the same to attain various set ups, a series of manually-controlled key levers, in number exceeding the number of fingers, and operating mechanisms from said key levers to set one or more fingers according to the particular key lever operation.

29. In combination, of vertically swingable gates each provided with operating means differing in arrangement from the means of the remaining gates, a conveyer moving longitudinally along said gates and comprising spaced pushers, each pusher provided with selective mechanism normally inoperative with respect to said operating means, each selective mechanism capable of being adjusted to position to select and actuate the operating means of any one of said gates to the exclusion of the operating means of the remaining gates, means for adjusting each selective mechanism, and normally-inoperative mechanism for successively delivering the articles to be distributed to said conveyer for distribution.

30. In combination, an elongated floor including a series of vertically-swingable gates each gate having operating means distinguished from the operating means of the remaining gates, of propelling devices movable over said floor, similar sets of adjustable selective elements moving with and corresponding to said propelling devices, respectively, and each adapted to be adjusted to a set up to actuate any one of said gate operating means to swing the gate thereof, setting-up mechanism common to all of said sets of selective elements, and means to return each set of selective elements to normal condition after performing its gate swinging operation.

31. In combination, a floor including a succession of swingable gates each provided with operating means, each gate having spring-actuated means normally locking the same in normal position and in elevated position when moved to that position, each gate also having means for swinging the same from elevated to normal position, a succession of propellers movable longitudinally of said floor and each adapted to operate said means for swinging the gates to normal position, and each provided with a set of adjustable elements capable of being adjusted to any set up to co-operate with the operating means of any gate to actuate the same to swing the gate to elevated position, means to return said adjustable elements to normal position, and setting-up mechanism common to all of said adjustable elements and provided with manual controlling means.

32. In combination, series of letter receptacles, series of letter depositing devices corresponding to said receptacles respectively, and adapted when moved to operative position to cause deposit of a letter in the receptacle represented by such device, each device being provided with operating means, an endless letter conveyor common to all of said receptacles and comprising an endless succession of letter propelling members successively moving into letter delivering position with respect to each letter depositing device, a slideway along which said members propel the letters, series of sets of selecting elements carried by said members, respectively, any one of which is adapted to be adjusted to inoperatively pass all other operating means but to select one of said operating means and to actuate the same to operate its letter depositing device to cause deposit of a letter from a certain letter propelling member into the receptacle represented by said letter depositing device, and a setting-up mechanism provided with adjusting means, said sets of selecting elements passing in succession into operative relation with respect to said setting up mechanism, substantially as, described.

33. In combination, a series of receptacles, an endless conveyor common to all said receptacles and embodying an endless succession of means to individually and successively receive the articles to be distributed and to maintain said articles separately and flatwise while being moved along said receptacles, keyboard-controlled mechanism for successively delivering articles to be distributed to said conveyor, swingable gates actuated by the forward movement of said conveyor for causing delivery of articles from said conveyor into any one of said receptacles, and manually controlled means for predetermining the receptacle into which each article will be delivered from said conveyor.

34. In combination, in a distributing apparatus, a distributing case comprising a plurality of rows of receptacles, a single continuously moving conveyor common to all of said rows of receptacles and to each receptacle and embodying an endless succession of means to individually and successively receive the articles to be distributed and to move said articles successively through said case and to the receptacles into which they are to be deposited and to maintain said articles spaced apart while being moved through the case, a common receiving station to which said means are successively presented to receive articles to be distributed, normally inactive means to successively deliver at said station the articles to be distributed, mechanisms to cause delivery of the articles to be distributed from said conveyor and into said receptacles, and manually controlled means predetermining the particular receptacle into which each article is to be deposited.

35. In combination, in a distributing apparatus, a distributing case comprising a plurality of rows of receptacles, a conveyor common to all of said receptacles and traveling in a tortuous path through said case and along all of said rows, a slideway continuous throughout said rows and from row to row and along which said conveyer propels letters from row to row and throughout each row mechanism for successively presenting the articles to be delivered at a common point to said conveyer, means for causing delivery of said articles from the conveyer and into said receptacles, and means for predetermining the particular receptacle into which each article is to be deposited.

36. In combination, in distributing apparatus, a distributing case comprising a plurality of parallel rows of receptacles and a passage way extending from the first receptacle of the first row throughout all of said rows to the last receptacle of the last row, an endless letter conveyer extending throughout the length of said passage and having a return ply at the exterior thereof, a single receiving station from which said conveyer receives the articles to be distributed, a movable device to successively deliver the articles to said conveyer in advance of said first receptacle mechanisms to cause delivery of the articles from said conveyer and into said receptacles irrespective of the order in which said articles were delivered to said conveyer, and devices predetermining the particular receptacle into which each article is to be delivered.

37. In distributing apparatus, an endless conveyer for delivering the articles to be distributed to the receptacles, comprising a chain carrying an endless succession of pushers, each provided with a selective device for actuating gate operating means, in combination with series of receptacles having ingress openings normally closed by swingable gates, each gate having operating means, and setting up mechanism for said selective devices.

38. In distributing apparatus, several non-alined rows of receptacles having open tops normally closed by gates forming a longitudinal floor over each row of said receptacles, in combination with a conveyer comprising endless chains and transverse spaced pushers movable longitudinally along said floor, and sorting mechanism actuated by the forward movement of said conveyer to open said gates for the discharge of letters into said receptacles and comprising setting up mechanism, selective devices set up thereby, and gate operating means.

39. In distributing apparatus, an endless conveyer comprising an endless flexible driving connection provided with an endless succession of uniformly spaced transversely arranged pushers, in combination with several non-alined rows of letter receptacles along which said pushers successively pass in letter delivering relation, a slideway along which the letters are propelled by said pushers, means to successively deliver letters to said slideway, and sorting mechanism embodying manually controlled setting up means whereby letters are discharged from said slideway to predetermined receptacles without regard to the order in which said letters were delivered to said slideway, said conveyer adapted to simultaneously propel a plurality of letters.

40. In distributing apparatus, a distributing case comprising rows of boxes spaced apart to form intervening spaces, said boxes having open tops and swingable gates normally closing said tops and forming floors along the rows, said gates having fingers, longitudinal strips arranged above said floors and co-operating therewith in forming letter passage ways between the boxes, in combination with a letter conveyer comprising spaced transverse letter pushers moving longitudinally through said passages and having portions extending into the spaces between said strips and into the spaces between said fingers.

41. Distributing apparatus comprising a row of open top receptacles, swingable fingered gates normally closing said receptacles with the fingers forming a longitudinal floor, in combination with a conveyer movable longitudinally of said floor and comprising transversely arranged pushers having portions movable longitudinally between said fingers and also having intervening recesses over the fingers, where by the pushers can move over an elevated gate.

42. Distributing apparatus comprising series of parallel rows of open top receptacles, a letter passage extending between all of said rows and connecting the rows and comprising longitudinal floors over the open tops of the receptacles and longitudinal top walls spaced from said floors, and pairs of curved walls at the adjacent ends of the rows connecting said floors and top walls to form curved slide ways joining the spaces between the floors and top walls, said floors, top walls, and curved walls having longitudinal openings, and an endless conveyer traveling through said passage and comprising transverse pushers traveling between said floors and top walls and between the curved walls of said pairs and having oppositely projecting portions traveling in said longitudinal openings.

43. In distributing apparatus, a distributing case comprising super-imposed rows of receptacles having ingress openings, and spaced parallel rails arranged longitudinally of said rows and extending from row to row, in combination with a conveyer movable along said receptacles and having wheels confined between and traveling longitudinally of said rails, mechanism for causing discharge of articles to be distributed from said conveyer and into said receptacles, and controlling means.

44. In a distributing apparatus, a distributing case comprising spaced parallel rows of receptacles having ingress openings with a tortuous passage extending through said case from the first receptacle of the first row and along each row and from row to row to the last receptacle of the last row and spaced trackways along said rows and curving from row to row, in combination with an endless conveyer movable in said passage way and having wheels confined and traveling in said trackways and letter propellers arranged transversely in and traveling longitudinally of said passage and successively moving into article delivery position with respect to said receptacles.

45. In distributing apparatus, in combination, an endless conveyer comprising a pair of endless flexible connections and cross members connecting said connections and forming an endless succession of pushers, guiding and driving means for said conveyer, a distributing case embodying rows of boxes, said conveyer arranged in said case and said pushers thereof successively moving into delivery relation with respect to every box of said case, each pusher having wheels at its opposite end portions, said case providing runways in which said wheels are confined to freely travel, and mechanism for causing discharge of articles to be distributed from said pushers and into said boxes embodying selective mechanism and a series of movable controlling members therefor.

46. In a distributing apparatus, in combination, a distributing case comprising series of parallel rows of fingered gates, the gates of each row being normally arranged in alinement and forming a longitudinal slideway, an endless conveyer common to all of the rows of slideways formed by said gates and having an endless succession of transversely arranged pushers sweeping longitudinally of said slideways, said pushers moving in the same direction along alternate slideways and in the reverse position and in the opposite direction along the intervening slideways, each pusher being approximately of similar formation at its upper and lower longitudinal edge portions and thereby being reversible, mechanism to move any gate to operative article receiving position with respect to any pusher, and controlling mechanism.

47. In a distributing apparatus, a distributing case comprising a plurality of rows of receptacles, and a single conveyer common to all of said receptacles and adapted to move through said case into operative article delivering relation with respect to each and every box of said case, said conveyer arranged to move said articles throughout the length of each row and vertically from row to row at the ends thereof, means for causing delivery of articles to be distributed from said conveyer into any box of the case, means for successively delivering articles to be distributed to said conveyer at a common point, and controlling mechanisms.

48. In distributing apparatus, in combination, letter propelling devices, each provided with a set of adjustable tumblers, a series of devices for causing discharge of letters from said propelling devices at different points of destination, each device of said series having an operating means arranged in a different vertical plane from the operating means of the remaining devices, each operating means adapted to be actuated by a set of tumblers when adjusted to a distinctive set up, said sets of tumblers when in normal position being inoperative with respect to said operating means, and setting up mechanism common to all of said sets of tumblers and embodying a plurality of controlling members exceeding the number of tumblers of any set and each connected and arranged to cause one or more tumblers to be set up during each tumbler setting up operation.

49. In distributing apparatus, sorting and article delivery mechanisms for receiving articles from a common point and delivering the same at predetermined delivery points comprising selective mechanism for predetermining the delivery point of an article to be distributed, embodying a set of independently rockable similar tumblers normally arranged in inoperative position, one or more of said tumblers adapted to be rocked to operative position to form any desired set up, distinctive operating devices adapted to cooperate with said selective mechanism, and manually controlled means for adjusting said tumblers to any desired set up embodying a number of controlling members exceeding the number of tumblers in any set.

50. In distributing apparatus, sorting and article delivery mechanisms for receiving articles from a common point and delivering the same at predetermined delivery points comprising selective mechanism for predetermining the delivery point of an article to be distributed, comprising a set of independently-rockable similar tumblers, each tumbler having means limiting its axial movement to rotation to and from set up position and normal inoperative position, operating devices adapted to be selected out and actuated by said tumblers, and means for setting up said tumblers, certain of said operating devices being actuated by said tumbler sets only when several tumblers of a set are set up, said means being capable of setting up any number of the tumblers of each set.

51. In distributing apparatus, in combination, selective mechanisms determining the delivery points of articles to be delivered comprising series of sets of similar tumblers, the tumblers of each set being independently rockable to and from normal and set up positions, means to cause discharge of letters at points of destination and each provided with distinctive operating means requiring a certain tumbler set up to cause actuation of said operating means, certain of said operating means being actuated only by set ups of several tumblers of a set, propelling mechanism whereby said sets of tumblers move in succession into operative relation with said distinctive operating means, and manually controlled tumbler adjusting or setting up mechanism common to all of said sets of tumblers and into operative relation with which said sets of tumblers successively move, said setting up mechanism capable of setting up any one or several of the tumblers of each set.

52. In distributing apparatus, in combination, series of article-discharging devices at the different points of destination, each discharging device provided with operating means, each operating means being distinctive with respect to the remaining operating means whereby each operating means can be actuated only by a certain tumbler set up, an endless conveyer common to all of said discharging devices and provided with a plurality of uniformly spaced and located sets of similar rockable tumblers, each set of tumblers being carried by and mounted on an axis moving with said conveyer and adapted to be adjusted to the set up required to actuate any one of said operating means, said sets of tumblers successively moving past all of said operating means, setting up mechanism common to all of said sets of tumblers and capable of setting up one or more tumblers of each set, said sets of tumblers successively moving past said setting up mechanism, manually controlled means for operating said setting up mechanism and embodying a number of movable controlling members exceeding the number of tumblers in any set, and means for returning the tumblers of each set to normal position after said tumblers have actuated an operating means.

53. In distributing apparatus, in combination, series of letter boxes, series of separate and independent gates normally closing said boxes, each box being provided with a gate, and letter conveying and box gate opening means for moving letters to said boxes and for positively forcing said gates to open position by the forward movement of said means.

54. In distributing apparatus, series of letter boxes, each box having a separate and independent gate normally closing the same against letter ingress, and letter-conveying and gate-opening means provided with series of gate selecting devices adapted to positively move gates to open position by the forward movement of said means, each gate having operating devices adapted to be positively engaged and moved by the selecting device operating the same.

55. In distributing apparatus, series of letter boxes, each box having an independent gate normally closing the same against letter ingress, and a continuously moving conveyer for moving letters to said boxes, said conveyer provided with gate selecting devices, each device adapted to be set to positively open but one of said gates by the forward movement of the conveyer.

56. In distributing apparatus, a series of normally-inactive independent and separate letter discharging gates at various points of letter destination, receptacles into which the letters are deflected by said gates and a positively actuated letter conveyer common to all of said discharging gates and provided with series of selecting devices, each adapted to be set to select but one of said discharging gates and positively actuate the same by the forward movement of said conveyer.

57. In distributing apparatus, series of normally-inactive letter discharging means at various points of distribution, said discharging means provided with independent operating means, respectively, each operating means embodying several contact members each having a free idler or inoperative movement and mechanism for locking said members against simultaneous free or idler movement and to operate said discharging means when all of said members are simultaneously moved in the same direction, said several operating means being rendered severally distinctive by different arrangements of said contact members, means for moving letters into operative delivery positions with respect to said discharging means, and selecting devices carried by said letter moving means and adapted to actuate said operating means by forcibly engaging and moving said contact members.

58. In distributing apparatus, operating means for letter discharging devices comprising a movable member having several movable contacts, each having a free, idle or inoperative movement, and a series of elements for locking said contacts to said movable member against simultaneous free movement, and series of selecting devices for engaging said contacts and actuating said members.

59. In distributing apparatus, sorting mechanism comprising selective devices, series of means operated by said selective devices for causing delivery of units being distributed at various points of distribution predetermined by said selective devices, said means consisting of a head having several parallel contact levers individually swingable independently of said head, and balls confined to said head and co-operating with said levers to lock the same against simultaneous swinging movement independently of said head.

60. In distributing apparatus, a series of independent rock shafts, each provided with fingers to form a gate, each shaft having an extended end provided with a lateral member for rocking the shaft to swing its gate to open position, said lateral members having differently arranged contact surfaces whereby each member is rendered distinctive with respect to the remaining members, and letter moving mechanism for moving letters into delivery relation with respect to said gates, said mechanism provided with and carrying series of gate swinging and selective devices for operatively engaging said surfaces to move said members and rock said shafts by the forward movement of said letter moving mechanism, said selective devices successively moving past all of said contact surfaces and being normally in inoperative position with respect thereto, and adapted to be adjusted to operative position with respect to any one of said lateral members.

61. In distributing apparatus, a distributing case of boxes, an endless conveyer moving in said case and comprising endless flexible driving connections provided with spaced transversely arranged pushers having extended ends, each extended end provided with and carrying a set of independently rockable tumblers, separate letter discharging devices for discharging letters from said pushers and into said boxes, said discharging devices provided with distinctive operating means, said tumblers successively moving past each operating means and adapted to be set up to operatively engage and actuate any one of said operating means, means to return said set up tumblers to normal position immediately after said tumblers have actuated said operating means, and a set of setting up devices common to all of said tumblers and adapted to adjust said tumblers, and manually actuated means controlling said setting up devices.

62. In distributing apparatus, in combination, a row of fingered independently swingable gates forming a letter floor, each gate having an extended shaft end provided with lateral means for rocking its shaft to open its gate, said lateral means having distinctive engaging surfaces, and a movable conveyer having transverse letter pushers sweeping longitudinally along said floor, each letter pusher having an extended end provided with a set of independently adjustable tumblers, said tumblers when in normal position being inoperative with respect to said lateral means, the tumblers of any set adapted to be adjusted to position to engage and operate the engaging surfaces of any lateral means to open its gate and to inoperatively move past all lateral means in advance of the one selected, each shaft having means to move adjusted tumblers to normal position, each pusher formed to close all open gates.

63. In distributing apparatus, in combination, a series of independently movable letter discharging means normally arranged in inoperative position and each provided with distinguishing operating means distinctive with respect to the remaining operating means, an endless conveyer providing a succession of letter compartments moving successively into letter delivering relation with respect to each discharging means, said conveyer provided with adjustable selecting devices for actuating said operating means but normally in inoperative position with respect to said operating means, manually controlled setting up mechanism common to all of said selecting devices and adapted to set up each selective device to co-operate with and actuate any one of said distinctive operating means and to inoperatively pass by all operating means in advance of the one selected, each discharging means provided with a member to return its discharging means to inoperative position, each compartment being provided with a selecting device to act on the operating means selected thereby before the compartment passes beyond letter delivering position with respect to the selected discharging means, said conveyer having means to actuate said members to return the discharging means to inoperative position, each discharging means provided with a selecting device restoring member normally in inoperative position and thrown to operative position in advance of the selecting device that has just caused the discharge means to move to operative position to restore said selecting device to normal position before it reaches the operating means next in advance to the one just operated.

64. In distributing apparatus, a box gate shaft having a member for rocking the same, and a rearwardly extending member for restoring the set up tumblers that have just actuated said shaft rocking member to normal position, and a forwardly extending member for returning the gate to closed position, said rearwardly and forwardly extending members being normally located in inoperative position, in combination with a letter mover formed to engage said forwardly extending member to return an open gate to closed position, and provided with a set of tumblers adapted to be set up to operate said shaft rocking member and to be returned to normal position by said rearwardly extending member.

65. In distributing apparatus, a box gate having its shaft provided with lateral operating means, a spring catch and arm for normally locking said gate in closed position and for holding said gate in open position when said gate has been swung to that position by said operating means, and a letter mover to move letters along said gate when closed, said pusher having selecting means to actuate said operating means.

66. In distributing apparatus, several normally closed independently swingable box gates each having a shaft provided with operating means to swing the gate to open position, each gate provided with means to detachably lock the same in closed position and in open position, and with a gate closing finger, and with a tumbler restoring member, in combination with a conveyer provided with transversely arranged spaced letter movers successively moving into operative relation with respect to each gate, each letter mover provided with a set of selecting devices adapted to be set up to co-operate with and actuate the operating means of any gate shaft and to be restored to normal position by the tumbler restoring member of said shaft, said gate adapted to be moved to closed position by the engagement with the letter mover immediately following the one that just caused opening of said gate.

67. In distributing apparatus, setting up mechanism comprising a series of movable fingers normally in inoperative position, a series of manually movable elements and operative connections therefrom to move one or more of said fingers to operative position, in combination with letter sorting means embodying selective devices moving in succession into operative relation with respect to said fingers and adapted to be adjusted thereby to produce various set ups for predetermining the delivery points of the letters.

68. In combination, a series of setting-up-mechanism controlling members corresponding to a series of points of distribution, distributing mechanism for conveying units to be distributed from a source of supply and delivering them at said points of distribution and provided with a series of selective devices each capable of being set up to cause delivery at any one of said points, and setting up mechanism common to and for setting up said selective devices and embodying a series of adjustable selective-device-rocking fingers normally arranged in inoperative position, the number of controlling members exceeding the number of fingers, some of said members being connected to adjust but one finger and other members connected to simultaneously adjust several fingers.

69. In distributing apparatus, an endless conveyer for moving letters to the various points of distribution, said conveyer provided with a series of similar sets of points-of-distribution-selecting tumblers, the tumblers of each set being independently adjustable, a series of tumbler setting up fingers in number equal to the number of tumblers in each set, said fingers being independently adjustable to operative position with respect to said tumblers to adjust the same, said sets of tumblers successively passing into operative relation with respect to said fingers, and a series of keys in number in excess of said fingers corresponding to and indicating the various points of distribution and operatively connected with and controlling the adjustment of said fingers to operative position, certain of said keys connected to simultaneously adjust several fingers.

70. In distributing apparatus, series of selecting devices determining the point of distribution at which each letter shall be delivered, in combination with a series of setting up fingers, manually actuated keys operatively connected to said fingers to adjust various combinations thereof to operative position with respect to said selecting devices, periodically movable means for forcing the adjusted fingers to operative position and for locking the adjusted and non-adjusted fingers and for returning the adjusted fingers to inoperative position.

71. In distributing apparatus, in combination, selecting devices determining the points of distribution of the letters, setting up fingers for adjusting said selecting devices to various set ups, said fingers being normally arranged in inoperative position, a series of movable elements corresponding to said fingers, each element being connected to operate a certain finger, and series of keys corresponding to and indicating the points of distribution, each key arranged to operate one or more of said movable elements to produce a certain combination of fingers adjusted to operative position with respect to said selecting devices.

72. In distributing apparatus, in combination, sorting mechanism for delivering pieces to be distributed at various points of distribution comprising series of sets of selecting devices for causing delivery of each piece being distributed at the desired point of distribution, a series of hooked setting up fingers normally located in inoperative position with respect to said selecting devices, a series of spring-held movable members for moving said fingers to setting up position, each finger operatively connected to one of said members, and a series of manually actuated keys corresponding to the various points of distribution, a series of rock shafts, each actuated by one of said keys, said movable members having series of shoulders, and each rock shaft having one or more lateral projections to engage the shoulders of one or more members and operatively move the same.

73. In distributing apparatus, a series of independent rock shafts provided with a series of manually operated shaft-rocking keys corresponding to and indicating the various points of distribution, a series of spring-held independent movable frames arranged transversely of said shafts and having openings receiving the same and series of shoulders, each shaft having one or more lateral projections to operatively engage a shoulder of one or more of said frames to operatively move the same when the shaft is rocked, each shaft adapted to move a different frame or combination of frames, a series of setting up devices corresponding to and connected to be operated by said frames, each device operated by a different frame, and sorting mechanism for delivering the pieces to be distributed at the various points of distribution, the point at which each piece is to be distributed being determined by the particular adjustment of said setting up devices.

74. Sorting mechanism for delivering the pieces to be distributed at the various points of distribution comprising similar moving sets of independently rockable tumblers determining by the adjustment thereof the points of distribution at which the pieces are deposited, setting up mechanism for said tumblers common to all said sets and comprising a series of fingers, each finger adapted to adjust corresponding tumblers of all or said sets, each finger being swingable to and from operative position and having an independently yielding hooked end to engage and rock its corresponding tumbler and to yield to permit passage of the tumbler after adjustment, and mechanisms for adjusting and controlling said fingers.

75. In distributing apparatus, setting up mechanism comprising a series of independently-movable setting up elements, manually controlled devices for adjusting various combinations of said elements, a movable locking member for periodically locking the adjusted and non-adjusted devices against movement and then returning the adjusted devices to normal position and releasing said devices for another adjustment, operating connections for said member, and sorting mechanism comprising selecting devices adapted to be set up by said adjusted elements.

76. In distributing apparatus, a normally-inactive driven member, driving means, coupling means for operatively connecting said member with said means for a stroke and then bringing the same to rest, normally inactive letter delivering means adapted to be operated a stroke at a time by said driven member, sorting mechanism adapted to successively receive letters from said letter delivering means and discharge the same at various points of distribution, a series of manually operated elements corresponding to and indicating said points of distribution and each adapted to cause said coupling means to connect said member with said driving means for a stroke, and setting up mechanism for determining the point of distribution at which each letter will be delivered comprising a series of movable setting up devices operatively connected with said manually operated elements to be adjusted thereby to various setting up combinations, and a normally-inactive movable locking member operatively connected with said driven member and on each operative stroke forcing adjusted setting up devices to operative position and locking all of said devices against operative movement.

77. In distributing apparatus, driving means, sorting mechanism comprising a series of independently adjustable setting up devices determining the points of distribution of the letters, a series of manually controlled devices for adjusting said devices to various setting up combinations, a normally-inactive movable lock for said devices at each stroke locking and then releasing them, a cam actuated by said driving means, and operating connections from said cam to said lock for operating the lock on a complete stroke on each revolution of the cam.

78. In distributing apparatus, in combination, an endless continuously moving conveyer for distributing the pieces to various points of distribution comprising an endless series of uniformly spaced sets of selecting elements carried by and traveling with said conveyer, a normally-inactive piece delivering member at each stroke adapted to deliver a piece to said conveyor, a series of independently-adjustable setting-up devices normally arranged in inoperative position with respect to said selecting elements, said sets of selecting elements successively moving into operative relation with respect to said setting-up devices, a series of manually actuated keys corresponding to and indicating the various points of distribution and each operatively connected to adjust said setting-up devices to various combinations, operating connections for causing said piece-delivering member to perform a stroke and then come to rest on the manual operation of any key, and means whereby after each operation of a key said setting up devices are returned to normal position ready for another adjustment before another set of selecting elements moves into operative relation with respect to said setting-up devices.

79. In distributing apparatus, in combination, a conveyer having a succession of portions to individually and successively receive pieces to be distributed to various points of distribution and to maintain said pieces separated while being conveyed, devices actuated by the forward movement of said conveyer to cause delivery of each piece at its predetermined point of distribution without regard to the order in which said pieces were received by said conveyer, manually-controlled means to predetermine the point of distribution of each piece, driving means continuously driving said conveyer on its forward movement, normally-inactive piece-delivering means, and mechanism for operatively coupling said piece-delivering means with said driving means at each actuation of a manually-controlled means, to drive said piece-delivery means on an operative stroke to deliver a piece to said conveyer and then come to rest.

80. In distributing apparatus, an endless conveyer having an endless succession of letter receiving portions movable successively into letter delivering relation with respect to each one of a plurality of points of distribution, actuating means continuously driving said conveyer, devices for causing delivery of letters from said portions at predetermined points of distribution, series of manually-controlled means predetermining the point of distribution of each letter delivered to said conveyer, a letter receiving station common to all of said portions of the conveyer, said portions successively moving into letter receiving relation with respect to said station on their way to said points of distribution, normally-inactive delivering means for successively delivering letters at said station, operative mechanism for causing said delivery means to perform a letter delivering stroke and then come to rest on each operation of a manually-controlled means, said devices for causing delivery of letters from said conveyer comprising series of sets of adjustable selecting devices carried by the conveyer and each corresponding to one of said portions of the conveyer, said series of manually controlled means comprising a setting-up mechanism common to all of said sets of selecting devices and adapted to adjust each set to predetermine the delivery point of each letter delivered to the conveyer, each set of selecting devices moving into operative relation with respect to said setting up mechanism approximately simultaneously with the passage of its corresponding portion of the conveyer into letter receiving relation with respect to said station.

81. In distributing apparatus, in combination, letter conveying and sorting mechanism, a receiving station from which said mechanism receives letters to distribute the same to various points of destination, and a rotary turret having a step by step motion to successively take letters from a common source, present them for printing, present them for inspection, and finally deliver them at said receiving station.

82. In distributing apparatus, in combination, a horizontally disposed letter receiving floor, a conveyer adapted to remove letters successively from said floor and convey the same to various points of distribution, and a rotary turret for successively delivering letters horizontally onto said floor and timed in its movement with respect to said conveyer.

83. In combination, a letter way, normally-inactive letter moving means having a step by step movement upwardly past said letter way to successively remove the foremost letters upwardly therefrom and successively present the letters at a letter inspection station and thereafter successively deposit the letters at a letter receiving station and letter distributing and conveying means successively removing the letters from said station and depositing the same at various points of distribution.

84. In distributing apparatus, in combination, letter conveying and distributing mechanisms for moving letters to and distributing the same at various predetermined points of distribution, a letter way, a movable normally-inactive separating means for separating the foremost letters successively from said way, normally inactive letter moving means at each stroke adapted to receive a letter from said separating means and finally deliver the letters successively to said letter conveying and distributing mechanisms. driving means, normally-inactive operating connections for said separating means, and said normally inactive letter moving means, coupling mechanism comprising a trip device for operatively connecting said driving means and said operating connections to operate said connections each one stroke and then bring the same to rest, and series of manually controlled devices operatively connected with said coupling mechanism.

85. In distributing apparatus, in combination, a continuously rotating drive shaft, a normally-inactive driven shaft, a clutch between said shafts and normally arranged out of gear, a spring-held trip normally holding said clutch out of gear and adapted to release the clutch to throw said driven shaft into gear with said drive shaft to make a single revolution and then automatically operate said clutch to throw the same out of gear, letter conveying and distributing mechanisms to receive letters from a common receiving station and deliver the same at various predetermined points of distribution, letter moving means operatively connected with and actuated by said driven shaft to successively receive letters from a letter way and deliver the same at said receiving station, normally inactive printing mechanism adapted to imprint each letter as the same is being advanced by said means, said printing mechanism operatively connected with and actuated by said driven shaft, and series of manually controlled finger pieces each having operative connection to said trip to cause the same to release said clutch on the operative movement of any one of said finger pieces.

86. In mail distributing apparatus, a letter way, in combination with means to successively grasp the lower edges of the foremost letters of said way and to push said letters successively upwardly from said way and to reverse said letters and move the same forwardly to an inspection station, and means to cause successive discharge of said letters at a receiving station, in combination with letter moving and distributing mechanism successively removing the letters from the receiving station and delivering the same at predetermined points of distribution 87. In distributing apparatus, a rotary turret for successively taking letters from a common source and delivering the same to distributing mechanism, said turret having means to grasp each letter by its edge portion leaving the remainder of each letter unobstructed, said turret being hollow and rotating with a step by step movement, in combination, with printing mechanism having a step by step movement and driven with said turret and comprising a rotary printing member and a rotary platen member having impression surfaces, one of said members being arranged within the turret and the other and co-operating member arranged at the exterior of the turret, substantially as described.

88. In distributing apparatus, distributing means for conveying the letters to and delivering the same at various predetermined points of distribution, and a rotary turret for receiving the letters from a common source and successively displaying the addressed faces thereof and then successively delivering the letters to said distributing means, said turret provided with a letter clamping device for positively gripping and holding the letters.

89. In distributing apparatus, distributing means for conveying the letters to and delivering the same at various predetermined points of delivery, in combination with a turret rotatable about a horizontal axis and provided with exterior letter gripping means and conrolling devices therefor, said turret arranged to successively remove letters from a common source and display the addressed faces thereof successively, and then successively deliver the letters to said distributing means.

90. In combination, in mail distributing apparatus, a series of mail depositories, means for moving letters thereto, letter discharging gates for causing discharge of letters from said means to said depositories, selective devices carried by said means for positively swinging said gates to cause discharge of letters from said means to said depositories, said selective devices being adjustable to set up positions, and manually controlled setting up machanism common to all of said selective devices, said selective devices being successively movable past said mechanism and being set up thereby by engagement therewith, said selective devices operating said letter discharging devices by the force due to the forward movement of said means.

91. In a mail distributing apparatus, in combination, an endless continuously moving letter conveyer, an elongated floor along which letters are propelled in succession by said conveyer, operating connections for continuously propelling the same, means for delivering letters successively from a common point onto said floor into the path of movement of said constantly traveling conveyer, series of letter receptacles, series of devices corresponding to said receptacles and adapted to cause delivery of any letter said floor to a predetermined receptacle, series of selective devices carried by said conveyer and adapted to positively actuate any one of said devices corresponding to said receptacles to cause delivery of a particular letter to a predetermined receptacle, and series of manually operated elements corresponding to said receptacles respectively, and adapted to predetermine the receptacle to which a letter is delivered by causing the setting of a selective device.

92. In distributing apparatus, in combination, a continuously rotating drive shaft, a normally-inactive driven shaft, a clutch between said shafts and normally arranged out of gear, a spring-held trip normally holding said clutch out of gear and adapted to release the clutch to throw said driven shaft into gear with said drive shaft to make a single revolution and then automatically operate said clutch to throw the same out of gear, letter conveying and distributing mechanisms to receive letters from a common receiving station and deliver the same at various predetermined points of distribution, letter moving means operatively connected with and actuated by said driven shaft to successively receive letters from a letter way and simultaneously advance several letters step by step and successively deliver the same at said receiving station, and series of manually controlled finger pieces each having operative connections to said trip to cause the same to release said clutch on the operative movement of any one of said finger pieces.

93. In distributing apparatus, in combination, a continuously operating driver, a normally-inactive driven member, a normally-disengaged clutch for driving said driven member from said driver, a trip normally maintaining said clutch disengaged and adapted to throw said clutch into action to operatively connect said driver and member to drive said member an operative stroke and then automatically disengage said clutch, conveying and distributing mechanisms for receiving and conveying units and distributing them at various predetermined points of distribution comprising selective devices for predetermining the point at which each unit is distributed, a keyboard controlling said selective devices, each key lever of said board operatively connected with said trip, to cause an operative stroke of said driven member on an operative movement of a key lever, and unit moving means actuated by said driven member and constructed and arranged to simultaneously advance several units in succession step by step and successively expose each unit for inspection by the operator and finally deliver each unit for distribution.

94. In a mail distributing system, a carrier for articles of mail, a device arranged to cause the carrier to discharge said articles of mail at predetermined points comprising a plurality of settable members, said members being adapted to be set in combinations including two or more members, and a keyboard-controlled device for setting said settable members, said device comprising keys and elements controlled thereby to set said settable members, certain keys controlling the setting of the settable members in combinations including two or more members.

95. In a mail sorting apparatus, the combination, with means for carrying the mail, of means for controlling the discharge therefrom comprising a plurality of settable members adapted to be set to combinations including two or more of said members, whereby the controller can be given a number of different settings that is greater than the number of settable members in the same.

96. In a mail distributing system, the combination with carriers having selector mechanisms, of a series of discharge stations having engaging members differently arranged and adapted to engage cooperating members of the selector mechanisms on the mail distributing carriers, said carriers being adapted to be moved past said stations, said engaging members being arranged in combination including two or more of said members.

97. In a mail sorting system, the combination with means for propelling articles of mail, of a selector for controlling the discharge thereof, said selector comprising a series of pivoted tumblers adapted to be held individually in active position in combinations including two or more tumblers.

98. A mail distributig system comprising a letter conveying means, a series of discharge stations, rearrangeable mechanism comprising a plurality of settable members adapted to be set to combinations including two or more members to determine the point of discharge of the letter, and a key board mechanism to collocate said rearrangeable mechanism.

99. In distributing apparatus, in combination, receptacles having inlets arranged in several rows in different planes, a single endless conveyer having a series of carriers each constructed and arranged to deliver a unit to any inlet of said several rows, keyboard controlled means for delivering units for distribution to said carriers, and keyboard controlled selector devices moving in unison with said carriers for predetermining the inlet at which the load of each carrier will be discharged.

100. Distributing apparatus for conveying units from a common source and distributing them to selected discharge stations, said apparatus being characterized by a series of selective devices for controlling the distribution of said units, and key-board-controlled setting up mechanism common to said several devices, each device being variously settable to attain with the one device any set up necessary to cause deposit of a unit at any one of a series of discharge stations, the total number of different set ups thereby attained by variously setting a device exceeding the number of members making up such device.

101. In distributing apparatus, in combination, means for conveying units to be distributed past a plurality of discharge stations, a plurality of keyboard controlled selective devices moving in unison with said means and predetermining and controlling the discharge of units from said means at said stations, normally-inactive means for simultaneously advancing several units step by step in succession and for successively exposing the units for inspection and successively delivering the units to said means for conveying the units to the stations selected therefor, and a keyboard controlling the unit advancing movements of said normally inactive means.

102. In distributing apparatus, in combination, a series of carriers each for successively propelling a unit to be distributed from a receiving station to any selected one of a plurality of discharge stations, a series of key board-controlled selectors moving in unison with said carriers and controlling the discharge of units therefrom, keyboard controlled means for advancing each unit to be distributed to an inspection station and there halting the same for inspection and for simultaneously advancing an inspected unit and delivering the same at said receiving station for distribution.

103. In distributing apparatus, in combination, a series of successive carriers traveling in a circuit past a receiving station and a plurality of discharge stations and each arranged to deliver a unit at any selected one of said discharge stations, a series of successive selectors traveling in unison with said carriers and predetermining and controlling the delivery of units by said carriers, unit delivering mechanism for successively delivering units one at a time to successive carriers, and a keyboard controlling the setting up of said selectors and also controlling said delivery mechanism, said mechanism arranged to simultaneously advance several successive units on each manual actuation of said keyboard, a selector being also set up on each manual actuation of said keyboard, said apparatus constructed and arranged to deliver a unit to display position after each manual operation of the keyboard, whereby the operator can then inspect the displayed unit and manually operate the keyboard to bring about the required selector set up that will cause final discharge of the displayed unit at the desired discharge station.

104. In distributing apparatus, in combination, a series of successive traveling carriers for distributing units to a plurality of discharge stations, each carrier provided with a selector controlling the discharge thereof, a holder for a supply of units to be distributed, conveying means for successively receiving units from said holder and delivering units one at a time to said carriers, respectively, said conveying means constructed and arranged to simultaneously advance several successive units, and a keyboard controlling said selectors and said conveying means, each keyboard operation causing a unit advancing operation of said conveying means and the setting up of a selector controlling the discharge of a unit advanced by a previous letter advancing operation of said conveying means.

105. In distributing apparatus, in combination, a series of successive traveling carriers for distributing units to a plurality of discharge stations, each carrier provided with a selector controlling the discharge thereof, a holder for a supply of units to be distributed, conveying means for successively receiving units from said holder and delivering units one at a time to said carriers, respectively, and a keyboard controlling said selectors and said conveying means, each keyboard operation causing a unit advancing operation of said conveying means and the setting up of a selector controlling the discharge of a unit advanced by a previous letter advancing operation of said conveying means, said conveying means constructed and arranged to display each unit to the view of the operator for selector setting keyboard operation after such unit has been advanced from said holder as the result of previous keyboard operation.

106. Distributing apparatus comprising a unit distributing conveyer, keyboard controlled selectors traveling with the conveyer, and keyboard controlled conveying unit-displaying means for successively advancing units and delivering them one at a time to said distributing conveyer, said conveyer, selectors and means being combined, constructed, and arranged to require each keyboard operation to cause a unit advancing operation and the setting up of a selector controlling the final distribution of a previously advanced unit, and to cause each such previously advanced unit to be displayed to the view of the operator preparatory to the operator's actuation of the keyboard to set up the selector controlling the distribution of such displayed unit.

107. Distributing apparatus comprising traveling selectors controlling the final distribution of the units to be distributed, each selector settable to various set ups to bring about discharge of a unit at any one of a series of discharge stations, setting up mechanism for successively setting up said selectors, and embodying several movable elements, a plurality of movable members exceeding the number of movable elements and controlling said setting up mechanism, and classifying mechanism operatively connecting said movable members with said setting up mechanism.

108. Distributing apparatus comprising traveling settable selectors controlling the final distribution of the units to be distributed, setting up mechanism for said selectors adjustable to various selector setting up combinations in number exceeding the number of movable setting up parts of said mechanism, a keyboard, and classifying mechanism through the medium of which said keyboard controls said setting up mechanism.

109. Distributing apparatus comprising traveling settable selectors controlling the final distribution of the units to be distributed, setting up mechanism for said selectors adjustable to various selector setting up combinations in number exceeding the number of movable setting up parts of said mechanism, and a keyboard controlling said setting up mechanism, said movable parts of the setting up mechanism having a range of operative movement independently of said keyboard.

110. Distributing apparatus comprising traveling settable selectors controlling the distribution of the units to be distributed, setting up mechanism for said selectors embodying movable setting up parts, and a keyboard controlling said setting up mechanism, said keyboard embodying independently movable setting up mechanism members in number exceeding the number of said parts of the setting up mechanism.

111. The combination of a keyboard, settable selectors, mechanism for setting the selectors under the control of the keyboard, said mechanism embodying a classifier whereby the number of controlling keys in the keyboard exceeds the number of settable parts of each selector, and discharging mechanism controlled by the selectors.

112. The combination of a keyboard, and unit distributing mechanism having selectors controlled by said keyboard and controlling the discharge of units, a series of mutually movable members, and mechanical connections between the keys of the keyboard and said members adapted to set the members in various combinations of relative positions greater in number than the number of said members.

113. The combination of a keyboard, a series of mutually movable members, and mechanical connections between the keys of the keyboard and said members adapted to set the members in various combinations of relative positions greater in number than the number of said members, said mechanical connections including primary and secondary movable elements and means for mechanically coupling them in various combinations.

114. The combination of a keyboard, a series of members adapted to be set in various combinations of relative positions greater in number than the number of said members, and connecting mechanism between said keyboard and said series of members comprising primary elements mechanically connected with the keys for actuation thereby, secondary elements actuating said members, and mechanism connecting said primary and secondary elements in various combinations.

115. The combination of a keyboard, a set of movable carriers, a settable selector on each carrier, a series of members adapted to be set in various combinations of relative positions and adapted to settingly coact with said selectors, and connecting mechanism between said keyboard and said series of members comprising primary elements mechanically actuated by the keys, secondary elements actuating said members, and mechanism connecting said primary and secondary elements in various combinations.

116. Distributing apparatus characterized by an endless distributing conveyer for the units to be distributed constructed and arranged to successively receive the units for distribution while said conveyer is advancing and to deliver the units at various discharge stations while said conveyer is advancing, a series of selectors traveling with said conveyer and controlling the delivery of units therefrom, setting up mechanism for setting up said selectors while the conveyer is advancing, and unit delivering mechanism arranged to display each unit and thereafter deliver the same to the conveyer, said unit delivering mechanism being timed with respect to the movement of the selectors past a given point.

117. Distributing apparatus characterized by an endless distributing conveyer for the units to be distributed constructed and arranged to successively receive the units for distribution while said conveyor is advancing and to deliver the units at various discharge stations while said conveyer is advancing, a series of selectors traveling with said conveyer and controlling the delivery of units therefrom, setting up mechanism for setting up said selectors while the conveyer is advancing, and unit delivering mechanism arranged to display each unit and thereafter deliver the same to the conveyer.

118. Distributing apparatus comprising mechanism for conveying units and distributing the same to various selected discharge stations, selectors controlling the discharge of units from said mechanism, setting up mechanism for said selectors, a plurality of movable elements controlling said setting up mechanism, a continuously moving driver, means driven by said driver and normally operatively disconnected therefrom, and devices whereby said means is caused to be operatively connected with the driver and driven thereby to act on said setting mechanism and then come to rest, on the operative movement of any one of said movable elements.

119. Distributing apparatus characterized by mechanisms for loosely confining and separately maintaining a plurality of flat units while said units rest loosely on bottom supports and while advancing said plurality of units for distribution at various discharge stations whereby when the bottom support of a unit is opened said unit will freely drop at the selected discharge station, said mechanisms embodying an endless conveyer provided with a closely-arranged longitudinal series of pockets each open to freely receive a flat unit and to loosely confine and isolate said unit while advancing the same, means for delivering units into said open pockets, and selectors controlling the discharge of units from said pockets.

In testimony whereof I affix my signature in presence of two witnesses.

ARTHUR J. BRIGGS.

Witnesses:
E. S. BOYNTON,
H. A. CARHART.